(12) United States Patent
Gong et al.

(10) Patent No.: US 10,139,596 B2
(45) Date of Patent: Nov. 27, 2018

(54) OPTICAL LENS SET

(71) Applicant: Genius Electronic Optical Co., Ltd., Taichung (TW)

(72) Inventors: Jinhui Gong, Fujian (CN); Tian Fang Gao, Fujian (CN); Meiting He, Fujian (CN)

(73) Assignee: Genius Electronic Optical (Xiamen) Co., Ltd., Xiamen, Fujian (CN)

(*) Notice: Subject to any disclaimer, the term of this patent is extended or adjusted under 35 U.S.C. 154(b) by 0 days.

(21) Appl. No.: 15/376,672

(22) Filed: Dec. 13, 2016

(65) Prior Publication Data

US 2018/0120538 A1    May 3, 2018

(30) Foreign Application Priority Data

Nov. 2, 2016   (CN) .......................... 2016 1 0947936

(51) Int. Cl.
| | |
|---|---|
| *G02B 9/62* | (2006.01) |
| *G02B 13/18* | (2006.01) |
| *G02B 13/00* | (2006.01) |
| *G02B 5/00* | (2006.01) |
| *G02B 27/00* | (2006.01) |
| *G02B 13/02* | (2006.01) |

(52) U.S. Cl.
CPC ......... *G02B 13/0045* (2013.01); *G02B 5/005* (2013.01); *G02B 9/62* (2013.01); *G02B 13/02* (2013.01); *G02B 27/0025* (2013.01)

(58) Field of Classification Search
CPC .............................. G02B 9/62; G02B 13/0045
USPC ................................ 359/713, 752, 756, 757
See application file for complete search history.

(56) References Cited

U.S. PATENT DOCUMENTS

| | | | |
|---|---|---|---|
| 5,612,823 A * | 3/1997 | Koizumi ............. | G02B 25/001 |
| | | | 359/644 |
| 2013/0070346 A1 | 3/2013 | Hsu | |
| 2013/0242362 A1 | 9/2013 | Nakayama | |
| 2015/0109685 A1* | 4/2015 | Shinohara ............... | G02B 9/60 |
| | | | 359/714 |
| 2015/0212319 A1 | 7/2015 | Nagano | |

OTHER PUBLICATIONS

Herbert Gross et al.: "Handbook of Optical Systems, vol. 3: Aberration Theory and Correction of Optical Systems" In: "Handbook of optical systems, Aberration theory and correction of optical systems", Jan. 1, 2007 (Jan. 1, 2007), wiley-VCH, Weinheim, DE, XP055258161, cover pages and pp. 377-379.

* cited by examiner

*Primary Examiner* — William Choi
(74) *Attorney, Agent, or Firm* — Winston Hsu

(57) ABSTRACT

An optical lens set includes no air gap between the first lens element and the second lens element, the third lens element of a concave object-side surface near its optical-axis, and the sixth lens element of a convex image-side surface near its periphery. The Abbe number v3 of the third lens element and the Abbe number v5 of the fifth lens element satisfy |v3−v5|≤25.

18 Claims, 27 Drawing Sheets

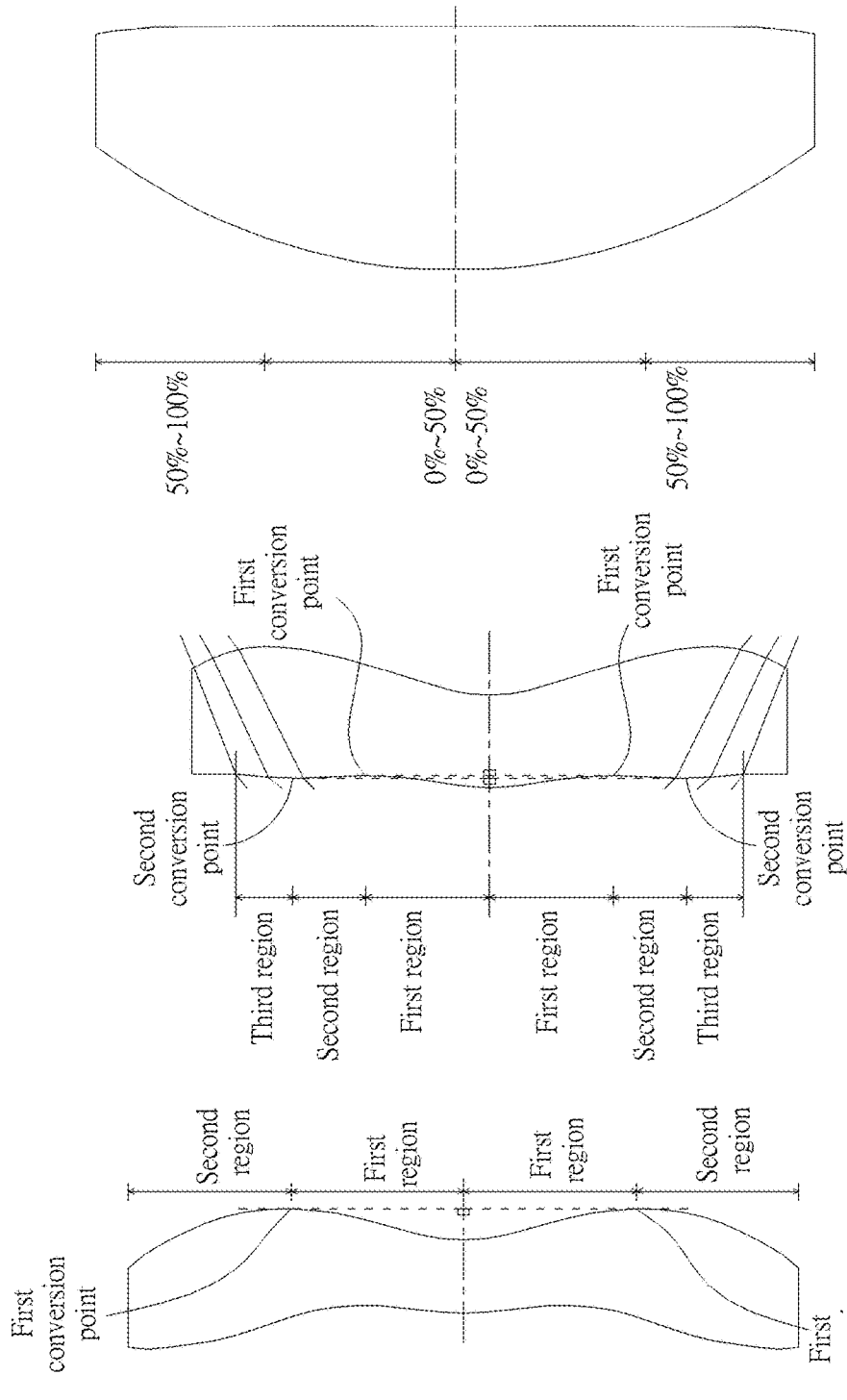

| First Example | | | | | |
|---|---|---|---|---|---|
| EFL=4.3242 mm | HFOV=38.4693 Degree | | TTL=5.5379 mm | | Fno=1.6689 |
| No. | | Curvature Radius | Ape. Stop Lens Thickness Air Gap | Refractive Index | Abbe No. | Focal Length |
| | Object | INFINITY | INFINITY | | | |
| 80 | Ape. Stop | INFINITY | -0.5159 | | | |
| 11 | First Lens | 1.8202 | 0.7533 $T_1$ | 1.5445 | 55.9870 | 3.2538 |
| 21 | Second Lens | 14.3163 | 0.2277 $T_2$ | 1.6614 | 20.4122 | -7.7619 |
| 22 | | 4.8544 | 0.7372 $G_{23}$ | | | |
| 31 | Third Lens | -15.8879 | 0.4184 $T_3$ | 1.5348 | 55.6899 | -24.3489 |
| 32 | | 74.2185 | 0.0873 $G_{34}$ | | | |
| 41 | Fourth Lens | 5.5021 | 0.2896 $T_4$ | 1.6614 | 20.4122 | -31.2083 |
| 42 | | 4.2604 | 0.3915 $G_{45}$ | | | |
| 51 | Fifth Lens | 38.6356 | 0.8926 $T_5$ | 1.5348 | 55.6899 | 2.1977 |
| 52 | | -1.2066 | 0.2141 $G_{56}$ | | | |
| 61 | Sixth Lens | 328.3626 | 0.4453 $T_6$ | 1.5348 | 55.6899 | -2.1138 |
| 62 | | 1.1298 | 0.3004 | | | |
| 70 | IR Filter | INFINITY | 0.1500 | 1.5168 | 64.1673 | |
| | | INFINITY | 0.6307 | | | |
| 71 | Image Plane | INFINITY | | | | |

FIG. 22

| No. | 11 | 22 | 31 | 32 | 41 |
|---|---|---|---|---|---|
| K | 1.0296E-01 | 5.4066E+00 | 0.0000E+00 | 0.0000E+00 | 0.0000E+00 |
| a4 | -2.8450E-03 | 7.7013E-03 | -6.2778E-03 | -5.0241E-02 | -2.1272E-01 |
| a6 | 1.2523E-02 | 1.4304E-02 | -1.3919E-01 | -2.3000E-01 | -8.6449E-02 |
| a8 | -2.2138E-02 | -6.5176E-02 | 2.7165E-01 | 5.8879E-01 | 2.3044E-01 |
| a10 | 2.5454E-02 | 1.4693E-01 | -5.1534E-01 | -7.8323E-01 | -5.0301E-02 |
| a12 | -1.5690E-02 | -1.8889E-01 | 5.1856E-01 | 5.2837E-01 | -2.4823E-01 |
| a14 | 5.0528E-03 | 1.2011E-01 | -2.8593E-01 | -1.9215E-01 | 2.1212E-01 |
| a16 | -6.6847E-04 | -3.0094E-02 | 5.9794E-02 | 3.1574E-02 | -5.0864E-02 |
| No. | 42 | 51 | 52 | 61 | 62 |
| K | -2.9727E+01 | 0.0000E+00 | -5.0545E+00 | 0.0000E+00 | -5.7935E+00 |
| a4 | -1.1374E-01 | 5.7106E-02 | -6.7178E-02 | -1.7562E-01 | -9.1532E-02 |
| a6 | -1.2416E-01 | -1.1731E-01 | 3.5975E-02 | 4.3983E-02 | 3.5954E-02 |
| a8 | 2.5443E-01 | 9.4990E-02 | -2.7558E-02 | -3.9274E-03 | -1.0650E-02 |
| a10 | -2.3543E-01 | -4.7899E-02 | 1.6180E-02 | 1.0076E-03 | 2.0411E-03 |
| a12 | 1.1072E-01 | 1.3749E-02 | -4.7053E-03 | -3.6049E-04 | -2.3931E-04 |
| a14 | -2.5163E-02 | -2.0350E-03 | 6.5374E-04 | 5.0219E-05 | 1.5431E-05 |
| a16 | 1.9693E-03 | 1.1581E-04 | -3.5612E-05 | -2.3979E-06 | -4.1368E-07 |

FIG. 23

| Second Example |||||||
|---|---|---|---|---|---|---|
| EFL=4.3868 mm || HFOV=38.2839 Degree ||| TTL=5.4423 mm | Fno=1.6661 |
| No. | | Curvature Radius | Ape. Stop Lens Thickness Air Gap || Refractive Index | Abbe No. | Focal Length |
| | Object | INFINITY | INFINITY ||||
| 80 | Ape. Stop | INFINITY | -0.5159 ||||
| 11 | First Lens | 1.8243 | 0.9564 | $T_1$ | 1.5445 | 55.9870 | 3.2658 |
| 21 | Second Lens | 14.5651 | 0.1978 | $T_2$ | 1.6614 | 20.4122 | -6.8230 |
| 22 | | 4.3039 | 0.6421 | $G_{23}$ |||
| 31 | Third Lens | -19.6135 | 0.3305 | $T_3$ | 1.5348 | 55.6899 | -47.4692 |
| 32 | | -85.7857 | 0.0959 | $G_{34}$ |||
| 41 | Fourth Lens | 5.7309 | 0.2618 | $T_4$ | 1.6614 | 20.4122 | -28.1385 |
| 42 | | 4.3103 | 0.4244 | $G_{45}$ |||
| 51 | Fifth Lens | 86.5323 | 0.7474 | $T_5$ | 1.5348 | 55.6899 | 2.2272 |
| 52 | | -1.2082 | 0.2414 | $G_{56}$ |||
| 61 | Sixth Lens | 77.1921 | 0.4368 | $T_6$ | 1.5348 | 55.6899 | -2.0466 |
| 62 | | 1.0806 | 0.3024 ||||
| 70 | IR Filter | INFINITY | 0.1500 || 1.5168 | 64.1673 ||
| | | INFINITY | 0.6555 ||||
| 71 | Image Plane | INFINITY ||||||

FIG. 24

| No. | 11 | 22 | 31 | 32 | 41 |
|---|---|---|---|---|---|
| K | 1.1832E-01 | 5.1981E+00 | 0.0000E+00 | 0.0000E+00 | 0.0000E+00 |
| a4 | -2.2053E-03 | 8.1631E-03 | -9.6658E-03 | -5.0241E-02 | -2.1693E-01 |
| a6 | 1.2523E-02 | 1.4304E-02 | -1.3919E-01 | -2.3000E-01 | -8.6449E-02 |
| a8 | -2.3209E-02 | -6.3436E-02 | 2.7190E-01 | 5.8879E-01 | 2.3225E-01 |
| a10 | 2.5433E-02 | 1.4795E-01 | -5.0868E-01 | -7.8323E-01 | -4.9505E-02 |
| a12 | -1.5448E-02 | -1.8837E-01 | 5.2291E-01 | 5.2837E-01 | -2.4702E-01 |
| a14 | 5.1673E-03 | 1.1928E-01 | -2.8833E-01 | -1.9215E-01 | 2.1324E-01 |
| a16 | -7.2652E-04 | -3.0233E-02 | 5.4083E-02 | 3.1574E-02 | -5.0180E-02 |
| No. | 42 | 51 | 52 | 61 | 62 |
| K | -4.0732E+01 | 0.0000E+00 | -5.2178E+00 | 0.0000E+00 | -5.6411E+00 |
| a4 | -1.1527E-01 | 5.4638E-02 | -6.6716E-02 | -1.7533E-01 | -9.2437E-02 |
| a6 | -1.2416E-01 | -1.1731E-01 | 3.5975E-02 | 4.3983E-02 | 3.5954E-02 |
| a8 | 2.5443E-01 | 9.4982E-02 | -2.7443E-02 | -3.9370E-03 | -1.0664E-02 |
| a10 | -2.3589E-01 | -4.7811E-02 | 1.6196E-02 | 1.0064E-03 | 2.0405E-03 |
| a12 | 1.1069E-01 | 1.3777E-02 | -4.7047E-03 | -3.6056E-04 | -2.3931E-04 |
| a14 | -2.4947E-02 | -2.0287E-03 | 6.5328E-04 | 5.0223E-05 | 1.5437E-05 |
| a16 | 2.1933E-03 | 1.1730E-04 | -3.5935E-05 | -2.3981E-06 | -4.1110E-07 |

FIG. 25

| Third Example |||||||
|---|---|---|---|---|---|---|
| EFL=4.3251 mm || HFOV= 38.9046 Degree || TTL=5.4403 mm | Fno=1.7302 ||
| No. | | Curvature Radius | Ape. Stop Lens Thickness Air Gap || Refractive Index | Abbe No. | Focal Length |
| | Object | INFINITY | INFINITY ||||||
| 80 | Ape. Stop | INFINITY | -0.5159 |||||
| 11 | First Lens | 1.8397 | 0.7142 | $T_1$ | 1.5445 | 55.9870 | 3.2912 |
| 21 | Second Lens | 15.1257 | 0.1632 | $T_2$ | 1.6614 | 20.4122 | -7.5193 |
| 22 | | 4.7286 | 0.7163 | $G_{23}$ ||||
| 31 | Third Lens | -12.2412 | 0.2790 | $T_3$ | 1.5348 | 55.6899 | -20.8731 |
| 32 | | 132.7602 | 0.0733 | $G_{34}$ ||||
| 41 | Fourth Lens | 5.7878 | 0.2398 | $T_4$ | 1.6614 | 20.4122 | -45.5445 |
| 42 | | 4.7811 | 0.4075 | $G_{45}$ ||||
| 51 | Fifth Lens | -126.2332 | 0.7357 | $T_5$ | 1.5348 | 55.6899 | 2.3875 |
| 52 | | -1.2708 | 0.2234 | $G_{56}$ ||||
| 61 | Sixth Lens | 15.2948 | 0.5244 | $T_6$ | 1.5348 | 55.6899 | -2.4345 |
| 62 | | 1.1891 | 0.4558 |||||
| 70 | IR Filter | INFINITY | 0.1500 || 1.5168 | 64.1673 ||
| | | INFINITY | 0.7577 |||||
| 71 | Image Plane | INFINITY ||||||

FIG. 26

| No. | 11 | 22 | 31 | 32 | 41 |
|---|---|---|---|---|---|
| K | 1.7823E-01 | 4.6075E+00 | 0.0000E+00 | 0.0000E+00 | 0.0000E+00 |
| a4 | -2.5346E-03 | 1.9100E-03 | -1.5365E-02 | -5.0241E-02 | -2.3638E-01 |
| a6 | 1.2523E-02 | 1.4304E-02 | -1.3919E-01 | -2.3000E-01 | -8.6449E-02 |
| a8 | -2.1357E-02 | -5.8090E-02 | 2.8732E-01 | 5.8879E-01 | 2.5281E-01 |
| a10 | 2.4985E-02 | 1.4892E-01 | -5.2249E-01 | -7.8323E-01 | -5.1052E-02 |
| a12 | -1.5606E-02 | -1.9090E-01 | 5.2058E-01 | 5.2837E-01 | -2.5025E-01 |
| a14 | 5.2415E-03 | 1.1832E-01 | -2.7794E-01 | -1.9215E-01 | 2.1262E-01 |
| a16 | -6.6022E-04 | -2.8520E-02 | 5.6503E-02 | 3.1574E-02 | -4.9615E-02 |
| No. | 42 | 51 | 52 | 61 | 62 |
| K | -6.7551E+01 | 0.0000E+00 | -5.5815E+00 | 0.0000E+00 | -5.9730E+00 |
| a4 | -1.2413E-01 | 6.9150E-02 | -5.0548E-02 | -1.6639E-01 | -9.0396E-02 |
| a6 | -1.2416E-01 | -1.1731E-01 | 3.5975E-02 | 4.3983E-02 | 3.5954E-02 |
| a8 | 2.5905E-01 | 9.1684E-02 | -2.7159E-02 | -4.3509E-03 | -1.0607E-02 |
| a10 | -2.3454E-01 | -4.6193E-02 | 1.5976E-02 | 9.9936E-04 | 2.0236E-03 |
| a12 | 1.1093E-01 | 1.3718E-02 | -4.7326E-03 | -3.5816E-04 | -2.3884E-04 |
| a14 | -2.4957E-02 | -2.1241E-03 | 6.5678E-04 | 5.0487E-05 | 1.5583E-05 |
| a16 | 2.1523E-03 | 1.2555E-04 | -3.5291E-05 | -2.3859E-06 | -4.3319E-07 |

FIG. 27

| Fourth Example ||||||
| EFL=4.0949 mm || HFOV=41.7104 Degree || TTL=5.3949 mm | Fno=1.8103 |
| No. | | Curvature Radius | Ape. Stop Lens Thickness Air Gap | | Refractive Index | Abbe No. | Focal Length |
|---|---|---|---|---|---|---|---|
| | Object | INFINITY | INFINITY | | | | |
| 11 | First Lens | 1.8165 | 0.6599 | $T_1$ | 1.5445 | 55.9870 | 4.1534 |
| 80 | Ape. Stop | INFINITY | | | | | |
| 21 | Second Lens | 7.4004 | 0.1784 | $T_2$ | 1.6614 | 20.4122 | -16.1897 |
| 22 | | 4.3492 | 0.6437 | $G_{23}$ | | | |
| 31 | Third Lens | -17.1459 | 0.4348 | $T_3$ | 1.5348 | 55.6899 | -125.3224 |
| 32 | | -23.2176 | 0.0957 | $G_{34}$ | | | |
| 41 | Fourth Lens | 50.7007 | 0.2611 | $T_4$ | 1.6614 | 20.4122 | -15.7484 |
| 42 | | 8.6855 | 0.2506 | $G_{45}$ | | | |
| 51 | Fifth Lens | 14.8036 | 0.9843 | $T_5$ | 1.5348 | 55.6899 | 2.4536 |
| 52 | | -1.4116 | 0.4192 | $G_{56}$ | | | |
| 61 | Sixth Lens | -15.9476 | 0.4312 | $T_6$ | 1.5350 | 55.7124 | -2.3512 |
| 62 | | 1.3835 | 0.3459 | | | | |
| 70 | IR Filter | INFINITY | 0.1500 | | 1.5168 | 64.1673 | |
| | | INFINITY | 0.5402 | | | | |
| 71 | Image Plane | INFINITY | | | | | |

FIG. 28

| No. | 11 | 22 | 31 | 32 | 41 |
|---|---|---|---|---|---|
| K | 1.1920E-01 | 5.2807E+00 | 0.0000E+00 | 0.0000E+00 | 0.0000E+00 |
| a4 | -4.3804E-04 | 5.3684E-03 | -2.9465E-02 | -5.0241E-02 | -1.8208E-01 |
| a6 | 1.5805E-02 | 1.2708E-02 | -1.0708E-01 | -2.3000E-01 | -9.2446E-02 |
| a8 | -2.2854E-02 | -6.1855E-02 | 2.6418E-01 | 5.8879E-01 | 2.4821E-01 |
| a10 | 2.5646E-02 | 1.5284E-01 | -5.1070E-01 | -7.8323E-01 | -5.4374E-02 |
| a12 | -1.5511E-02 | -1.8812E-01 | 5.2235E-01 | 5.2837E-01 | -2.4982E-01 |
| a14 | 5.3434E-03 | 1.1529E-01 | -2.7999E-01 | -1.9215E-01 | 2.1493E-01 |
| a16 | -6.5547E-04 | -2.8193E-02 | 5.2833E-02 | 3.1574E-02 | -5.0484E-02 |
| No. | 42 | 51 | 52 | 61 | 62 |
| K | -2.0485E+01 | 0.0000E+00 | -4.9169E+00 | 0.0000E+00 | -5.9727E+00 |
| a4 | -1.2945E-01 | 1.9049E-02 | -5.3033E-02 | -1.3600E-01 | -8.1620E-02 |
| a6 | -9.7287E-02 | -9.6884E-02 | 3.0287E-02 | 3.6993E-02 | 3.4740E-02 |
| a8 | 2.5583E-01 | 9.2354E-02 | -2.6132E-02 | -4.0842E-03 | -1.0365E-02 |
| a10 | -2.3638E-01 | -4.7845E-02 | 1.6070E-02 | 1.0695E-03 | 1.9904E-03 |
| a12 | 1.1052E-01 | 1.3758E-02 | -4.7331E-03 | -3.5380E-04 | -2.3647E-04 |
| a14 | -2.5026E-02 | -2.0433E-03 | 6.5345E-04 | 5.0123E-05 | 1.5677E-05 |
| a16 | 2.1765E-03 | 1.2291E-04 | -3.4867E-05 | -2.5313E-06 | -4.4176E-07 |

FIG. 29

| Fifth Example ||||||
|---|---|---|---|---|---|
| EFL=3.9234 mm || HFOV=42.2274 Degree || TTL=5.4151 mm | Fno=1.7232 |
| No. | | Curvature Radius | Ape. Stop Lens Thickness Air Gap | Refractive Index | Abbe No. | Focal Length |
| | Object | INFINITY | INFINITY | | | |
| 80 | Ape. Stop | INFINITY | -0.4093 | | | |
| 11 | First Lens | 1.9214 | 0.5695 $T_1$ | 1.5445 | 55.9870 | 3.4538 |
| 21 | Second Lens | 20.6927 | 0.1556 $T_2$ | 1.6614 | 20.4122 | -9.3434 |
| 22 | | 5.9078 | 0.6228 $G_{23}$ | | | |
| 31 | Third Lens | -9.0177 | 0.3181 $T_3$ | 1.5348 | 55.6899 | -15.4127 |
| 32 | | 100.9992 | 0.0333 $G_{34}$ | | | |
| 41 | Fourth Lens | 6.0084 | 0.2597 $T_4$ | 1.6614 | 20.4122 | -507.3520 |
| 42 | | 5.8015 | 0.2791 $G_{45}$ | | | |
| 51 | Fifth Lens | 8.4038 | 1.2601 $T_5$ | 1.5348 | 55.6899 | 2.2086 |
| 52 | | -1.3074 | 0.1793 $G_{56}$ | | | |
| 61 | Sixth Lens | -18.2792 | 0.6118 $T_6$ | 1.5348 | 55.6899 | -2.1218 |
| 62 | | 1.2283 | 0.3459 | | | |
| 70 | IR Filter | INFINITY | 0.1500 | 1.5168 | 64.1673 | |
| | | INFINITY | 0.6299 | | | |
| 71 | Image Plane | INFINITY | | | | |

FIG. 30

| No. | 11 | 22 | 31 | 32 | 41 |
|---|---|---|---|---|---|
| K | 6.6081E-02 | 6.3036E+00 | 0.0000E+00 | 0.0000E+00 | 0.0000E+00 |
| a4 | -4.9870E-05 | 7.3600E-03 | 3.6125E-03 | -5.0241E-02 | -2.0185E-01 |
| a6 | 1.8131E-02 | 4.2802E-03 | -1.2481E-01 | -2.3000E-01 | -7.0100E-02 |
| a8 | -2.4920E-02 | -5.6597E-02 | 2.4079E-01 | 5.8879E-01 | 2.3116E-01 |
| a10 | 2.6023E-02 | 1.5435E-01 | -4.6796E-01 | -7.8323E-01 | -5.4478E-02 |
| a12 | -1.4877E-02 | -1.9080E-01 | 5.2594E-01 | 5.2837E-01 | -2.4707E-01 |
| a14 | 5.2821E-03 | 1.1464E-01 | -3.0641E-01 | -1.9215E-01 | 2.1546E-01 |
| a16 | -8.3856E-04 | -2.7521E-02 | 6.5016E-02 | 3.1574E-02 | -5.0706E-02 |
| No. | 42 | 51 | 52 | 61 | 62 |
| K | -8.1866E+01 | 0.0000E+00 | -5.1021E+00 | 0.0000E+00 | -5.5263E+00 |
| a4 | -1.0032E-01 | 4.4758E-03 | -7.3419E-02 | -1.5213E-01 | -7.9570E-02 |
| a6 | -1.1181E-01 | -8.3751E-02 | 3.9267E-02 | 4.1185E-02 | 3.5131E-02 |
| a8 | 2.5564E-01 | 8.5527E-02 | -2.8249E-02 | -4.0625E-03 | -1.0739E-02 |
| a10 | -2.3381E-01 | -4.5736E-02 | 1.6238E-02 | 1.0350E-03 | 2.0675E-03 |
| a12 | 1.1062E-01 | 1.3573E-02 | -4.6944E-03 | -3.5826E-04 | -2.3974E-04 |
| a14 | -2.5718E-02 | -2.1823E-03 | 6.5334E-04 | 4.9982E-05 | 1.5095E-05 |
| a16 | 2.4497E-03 | 1.5166E-04 | -3.6011E-05 | -2.4145E-06 | -3.9316E-07 |

FIG. 31

| Sixth Example |||||
|---|---|---|---|---|
| EFL=4.1152 mm | HFOV=40.8937 Degree || TTL= 5.4975 mm | Fno=1.7229 |
| No. | Curvature Radius | Ape. Stop Lens Thickness Air Gap | Refractive Index | Abbe No. | Focal Length |
| | Object | INFINITY | INFINITY | | | |
| 80 | Ape. Stop | INFINITY | -0.4651 | | | |
| 11 | First Lens | 1.8794 | 0.5863 | $T_1$ | 1.5445 | 55.9870 | 3.3351 |
| 21 | Second Lens | 11.7326 | 0.3224 | $T_2$ | 1.6614 | 20.4122 | -7.9524 |
| 22 | | 4.8941 | 0.5378 | $G_{23}$ | | | |
| 31 | Third Lens | -1675.0296 | 0.3481 | $T_3$ | 1.5348 | 55.6899 | -35.7552 |
| 32 | | 19.4095 | 0.0822 | $G_{34}$ | | | |
| 41 | Fourth Lens | 7.0029 | 0.2548 | $T_4$ | 1.6614 | 20.4122 | -116.5377 |
| 42 | | 6.3307 | 0.2525 | $G_{45}$ | | | |
| 51 | Fifth Lens | 33.0429 | 1.2175 | $T_5$ | 1.5348 | 55.6899 | 2.3379 |
| 52 | | -1.2872 | 0.2032 | $G_{56}$ | | | |
| 61 | Sixth Lens | -12.6043 | 0.5597 | $T_6$ | 1.5348 | 55.6899 | -2.1760 |
| 62 | | 1.3067 | 0.3459 || | | |
| 70 | IR Filter | INFINITY | 0.1500 || 1.5168 | 64.1673 | |
| | | INFINITY | 0.6371 || | | |
| 71 | Image Plane | INFINITY | | | | | |

FIG. 32

| No. | 11 | 22 | 31 | 32 | 41 |
|---|---|---|---|---|---|
| K | 1.1920E-01 | 5.2807E+00 | 0.0000E+00 | 0.0000E+00 | 0.0000E+00 |
| a4 | -2.2501E-03 | 3.6491E-03 | -1.3166E-02 | -5.0241E-02 | -1.7142E-01 |
| a6 | 1.4249E-02 | 1.2078E-02 | -1.0658E-01 | -2.3000E-01 | -1.0870E-01 |
| a8 | -2.1344E-02 | -6.1855E-02 | 2.5639E-01 | 5.8879E-01 | 2.5186E-01 |
| a10 | 2.4130E-02 | 1.5249E-01 | -4.9580E-01 | -7.8323E-01 | -5.5224E-02 |
| a12 | -1.5687E-02 | -1.8910E-01 | 5.2274E-01 | 5.2837E-01 | -2.4847E-01 |
| a14 | 5.9060E-03 | 1.1618E-01 | -2.8952E-01 | -1.9215E-01 | 2.1700E-01 |
| a16 | -9.2108E-04 | -2.8685E-02 | 5.8509E-02 | 3.1574E-02 | -5.1690E-02 |
| No. | 42 | 51 | 52 | 61 | 62 |
| K | -2.0485E+01 | 0.0000E+00 | -4.9169E+00 | 0.0000E+00 | -5.9727E+00 |
| a4 | -1.1539E-01 | 3.8770E-03 | -8.1305E-02 | -1.4519E-01 | -7.8704E-02 |
| a6 | -9.7885E-02 | -8.2814E-02 | 4.0936E-02 | 3.7246E-02 | 3.3624E-02 |
| a8 | 2.5271E-01 | 9.0234E-02 | -2.8443E-02 | -4.3727E-03 | -1.0225E-02 |
| a10 | -2.3373E-01 | -4.8490E-02 | 1.6174E-02 | 1.0120E-03 | 1.9686E-03 |
| a12 | 1.1072E-01 | 1.3824E-02 | -4.7011E-03 | -3.4615E-04 | -2.3349E-04 |
| a14 | -2.5428E-02 | -2.0027E-03 | 6.5099E-04 | 5.2473E-05 | 1.5423E-05 |
| a16 | 2.2386E-03 | 1.1787E-04 | -3.5177E-05 | -2.8053E-06 | -4.3959E-07 |

FIG. 33

| Seventh Example |||||
|---|---|---|---|---|
| EFL=4.1663 mm | HFOV=39.7529 Degree || TTL=5.4927 mm | Fno=1.7150 |
| No. | | Curvature Radius | Ape. Stop Lens Thickness Air Gap | Refractive Index | Abbe No. | Focal Length |
| | Object | INFINITY | INFINITY | | | |
| 80 | Ape. Stop | INFINITY | -0.4756 | | | |
| 11 | First Lens | 1.9116 | 0.6879 $T_1$ | 1.5445 | 55.9870 | 3.4173 |
| 21 | Second Lens | 15.3879 | 0.1704 $T_2$ | 1.6614 | 20.4122 | -8.6826 |
| 22 | | 5.4186 | 0.6043 $G_{23}$ | | | |
| 31 | Third Lens | -18.1569 | 0.3127 $T_3$ | 1.5348 | 55.6899 | -19.5593 |
| 32 | | 25.0218 | 0.0817 $G_{34}$ | | | |
| 41 | Fourth Lens | 6.7831 | 0.2716 $T_4$ | 1.6614 | 20.4122 | -43.5279 |
| 42 | | 5.4107 | 0.1274 $G_{45}$ | | | |
| 51 | Fifth Lens | -17.0234 | 1.0231 $T_5$ | 1.5348 | 55.6899 | 3.0347 |
| 52 | | -1.5174 | 0.7065 $G_{56}$ | | | |
| 61 | Sixth Lens | -17.7582 | 0.4834 $T_6$ | 1.5348 | 55.6899 | -3.2236 |
| 62 | | 1.9346 | 0.3459 | | | |
| 70 | IR Filter | INFINITY | 0.1500 | 1.5168 | 64.1673 | |
| | | INFINITY | 0.5279 | | | |
| 71 | Image Plane | INFINITY | | | | |

FIG. 34

| No. | 11 | 22 | 31 | 32 | 41 |
|---|---|---|---|---|---|
| K | -7.6977E-03 | 3.3749E+00 | 0.0000E+00 | 0.0000E+00 | 0.0000E+00 |
| a4 | 1.9341E-03 | 5.4814E-03 | -2.5887E-02 | -5.0241E-02 | -1.7964E-01 |
| a6 | 1.5449E-02 | 2.0608E-02 | -9.5284E-02 | -2.3000E-01 | -1.2625E-01 |
| a8 | -2.3150E-02 | -8.4154E-02 | 2.6294E-01 | 5.8879E-01 | 2.4944E-01 |
| a10 | 2.6452E-02 | 1.7465E-01 | -5.4940E-01 | -7.8323E-01 | -4.0401E-02 |
| a12 | -1.6057E-02 | -1.8924E-01 | 5.8472E-01 | 5.2837E-01 | -2.5947E-01 |
| a14 | 5.4347E-03 | 1.0456E-01 | -3.1390E-01 | -1.9215E-01 | 2.1871E-01 |
| a16 | -7.0935E-04 | -2.3486E-02 | 6.2576E-02 | 3.1574E-02 | -5.0939E-02 |
| No. | 42 | 51 | 52 | 61 | 62 |
| K | -1.9727E+01 | 0.0000E+00 | -4.1668E+00 | 0.0000E+00 | -8.9788E-01 |
| a4 | -9.5057E-02 | 3.8753E-02 | -6.4393E-02 | -8.1382E-02 | -1.2728E-01 |
| a6 | -1.4561E-01 | -1.2085E-01 | 4.2264E-02 | 1.9713E-02 | 4.4050E-02 |
| a8 | 2.5500E-01 | 1.0415E-01 | -2.6479E-02 | -4.9240E-03 | -1.1833E-02 |
| a10 | -2.2529E-01 | -4.8137E-02 | 1.5512E-02 | 1.6923E-03 | 2.0642E-03 |
| a12 | 1.1162E-01 | 1.3403E-02 | -4.7204E-03 | -3.3777E-04 | -2.2092E-04 |
| a14 | -2.7477E-02 | -2.0731E-03 | 6.7478E-04 | 3.2535E-05 | 1.3110E-05 |
| a16 | 2.6764E-03 | 1.3372E-04 | -3.6980E-05 | -1.2320E-06 | -3.2988E-07 |

FIG. 35

| Eighth Example ||||||
|---|---|---|---|---|---|
| EFL=4.7008 mm | HFOV=38.206 Degree || TTL= 5.1147 mm || Fno=1.3647 |
| No. | Curvature Radius | Ape. Stop Lens Thickness Air Gap || Refractive Index | Abbe No. | Focal Length |
| | Object | INFINITY | INFINITY | | | |
| 80 | Ape. Stop | INFINITY | -0.6565 | | | |
| 11 | First Lens | 1.8221 | 1.1496 | $T_1$ | 1.5445 | 55.9870 | 3.3890 |
| 21 | Second Lens | -19.7928 | 0.1598 | $T_2$ | 1.6614 | 20.4122 | -9.4740 |
| 22 | | 6.7134 | 0.5453 | $G_{23}$ | | | |
| 31 | Third Lens | -14.4997 | 0.2934 | $T_3$ | 1.5348 | 55.6899 | -30.2590 |
| 32 | | -136.5213 | 0.0272 | $G_{34}$ | | | |
| 41 | Fourth Lens | 1825.6164 | 0.4136 | $T_4$ | 1.6614 | 20.4122 | -11.3460 |
| 42 | | 7.5381 | 0.1763 | $G_{45}$ | | | |
| 51 | Fifth Lens | -8.2719 | 0.6904 | $T_5$ | 1.5348 | 55.6899 | 2.3830 |
| 52 | | -1.1399 | 0.0934 | $G_{56}$ | | | |
| 61 | Sixth Lens | 29.8700 | 0.5995 | $T_6$ | 1.5348 | 55.6899 | -2.3740 |
| 62 | | 1.2130 | 0.3459 || | | |
| 70 | IR Filter | INFINITY | 0.1500 || 1.5168 | 64.1673 | |
| | | INFINITY | 0.4702 || | | |
| 71 | Image Plane | INFINITY | | | | |

FIG. 36

| No. | 11 | 22 | 31 | 32 | 41 |
|---|---|---|---|---|---|
| K | 4.098725E-01 | 7.229708E+00 | 0.000000E+00 | 0.000000E+00 | 0.000000E+00 |
| a4 | -8.732122E-03 | 1.485177E-03 | -5.511636E-02 | -5.024141E-02 | -8.029423E-02 |
| a6 | 3.473689E-03 | 4.094082E-02 | -7.627678E-03 | -2.299986E-01 | -1.616683E-01 |
| a8 | -1.708534E-02 | -1.129714E-01 | 1.345300E-01 | 5.887865E-01 | 2.220767E-01 |
| a10 | 2.446074E-02 | 1.779781E-01 | -4.930340E-01 | -7.832261E-01 | 1.418882E-02 |
| a12 | -2.063440E-02 | -1.589037E-01 | 6.479028E-01 | 5.283746E-01 | -2.967266E-01 |
| a14 | 8.890379E-03 | 7.617988E-02 | -3.980633E-01 | -1.921516E-01 | 2.357832E-01 |
| a16 | -1.602083E-03 | -1.555879E-02 | 9.007012E-02 | 3.157409E-02 | -5.593399E-02 |
| No. | 42 | 51 | 52 | 61 | 62 |
| K | -5.035881E+13 | 0.000000E+00 | -4.165642E+00 | 0.000000E+00 | -6.566128E+00 |
| a4 | -3.007547E-02 | 3.617504E-02 | -5.113384E-02 | -1.415433E-01 | -6.756410E-02 |
| a6 | -1.600847E-01 | -1.070617E-01 | 5.843942E-03 | 5.088361E-02 | 2.863698E-02 |
| a8 | 2.360278E-01 | 6.715790E-02 | 1.492844E-03 | -9.975485E-03 | -8.695656E-03 |
| a10 | -2.249792E-01 | -3.807418E-02 | 6.956181E-03 | 1.898956E-03 | 1.624163E-03 |
| a12 | 1.235259E-01 | 1.488117E-02 | -4.812396E-03 | -3.272256E-04 | -1.862046E-04 |
| a14 | -3.436938E-02 | -2.726660E-03 | 1.250159E-03 | 3.187457E-05 | 1.183331E-05 |
| a16 | 3.949244E-03 | 1.761130E-04 | -1.242186E-04 | -1.189005E-06 | -3.214106E-07 |

FIG. 37

| Example | First | Second | Third | Fourth | Fifth | Sixth | Seventh | Eighth |
|---|---|---|---|---|---|---|---|---|
| $T_1$ | 0.753 | 0.956 | 0.714 | 0.660 | 0.569 | 0.586 | 0.688 | 1.150 |
| $G_{12}$ | 0.000 | 0.000 | 0.000 | 0.000 | 0.000 | 0.000 | 0.000 | 0.000 |
| $T_2$ | 0.228 | 0.198 | 0.163 | 0.178 | 0.156 | 0.322 | 0.170 | 0.160 |
| $G_{23}$ | 0.737 | 0.642 | 0.716 | 0.644 | 0.623 | 0.538 | 0.604 | 0.545 |
| $T_3$ | 0.418 | 0.330 | 0.279 | 0.435 | 0.318 | 0.348 | 0.313 | 0.293 |
| $G_{34}$ | 0.087 | 0.096 | 0.073 | 0.096 | 0.033 | 0.082 | 0.082 | 0.027 |
| $T_4$ | 0.290 | 0.262 | 0.240 | 0.261 | 0.260 | 0.255 | 0.272 | 0.414 |
| $G_{45}$ | 0.392 | 0.424 | 0.408 | 0.251 | 0.279 | 0.253 | 0.127 | 0.176 |
| $T_5$ | 0.893 | 0.747 | 0.736 | 0.984 | 1.260 | 1.218 | 1.023 | 0.690 |
| $G_{56}$ | 0.214 | 0.241 | 0.223 | 0.419 | 0.179 | 0.203 | 0.706 | 0.093 |
| $T_6$ | 0.445 | 0.437 | 0.524 | 0.431 | 0.612 | 0.560 | 0.483 | 0.600 |
| G6F | 0.300 | 0.302 | 0.456 | 0.346 | 0.346 | 0.346 | 0.346 | 0.346 |
| TF | 0.150 | 0.150 | 0.150 | 0.150 | 0.150 | 0.150 | 0.150 | 0.150 |
| GFP | 0.631 | 0.655 | 0.758 | 0.540 | 0.630 | 0.637 | 0.528 | 0.470 |
| AAG | 1.430 | 1.404 | 1.420 | 1.409 | 1.115 | 1.076 | 1.520 | 0.842 |
| ALT | 3.027 | 2.931 | 2.656 | 2.950 | 3.175 | 3.289 | 2.949 | 3.306 |
| BFL | 1.081 | 1.108 | 1.364 | 1.036 | 1.126 | 1.133 | 1.024 | 0.966 |
| TTL | 5.538 | 5.442 | 5.440 | 5.395 | 5.415 | 5.498 | 5.493 | 5.115 |
| EFL | 4.324 | 4.387 | 4.325 | 4.095 | 3.923 | 4.115 | 4.166 | 4.701 |
| TL | 4.457 | 4.334 | 4.077 | 4.359 | 4.289 | 4.364 | 4.469 | 4.149 |
| $\|\upsilon 3-\upsilon 5\|$ | 0.000 | 0.000 | 0.000 | 0.000 | 0.000 | 0.000 | 0.000 | 0.000 |
| $T_3/T_2$ | 1.838 | 1.670 | 1.709 | 2.437 | 2.045 | 1.080 | 1.836 | 1.836 |
| $EFL/(G_{34}+G_{56})$ | 14.350 | 13.006 | 14.580 | 7.952 | 18.452 | 14.420 | 5.286 | 38.956 |
| $T_5/(G_{34}+G_{56})$ | 2.962 | 2.216 | 2.480 | 1.911 | 5.926 | 4.266 | 1.298 | 5.721 |
| $BFL/(G_{34}+G_{56})$ | 3.587 | 3.284 | 4.596 | 2.012 | 5.295 | 3.970 | 1.299 | 8.006 |
| $T_2/G_{56}$ | 1.064 | 0.820 | 0.731 | 0.426 | 0.868 | 1.587 | 0.241 | 1.711 |
| $AAG/G_{56}$ | 6.681 | 5.815 | 6.359 | 3.362 | 6.216 | 5.294 | 2.151 | 9.014 |
| $EFL/T_6$ | 9.711 | 10.043 | 8.248 | 9.497 | 6.413 | 7.353 | 8.619 | 7.841 |
| $T_1/G_{45}$ | 1.924 | 2.254 | 1.753 | 2.634 | 2.040 | 2.322 | 5.399 | 6.522 |
| $ALT/T_4$ | 10.452 | 11.194 | 11.077 | 11.298 | 12.226 | 12.908 | 10.857 | 7.994 |
| EFL/BFL | 4.000 | 3.960 | 3.172 | 3.952 | 3.485 | 3.632 | 4.070 | 4.866 |
| $T_6/T_4$ | 1.538 | 1.668 | 2.187 | 1.651 | 2.356 | 2.197 | 1.780 | 1.449 |
| TTL/AAG | 3.872 | 3.877 | 3.830 | 3.828 | 4.859 | 5.111 | 3.614 | 6.073 |
| $ALT/T_6$ | 6.797 | 6.710 | 5.065 | 6.841 | 5.189 | 5.876 | 6.101 | 5.515 |
| $T_1/G_{23}$ | 1.022 | 1.489 | 0.997 | 1.025 | 0.914 | 1.090 | 1.138 | 2.108 |

FIG. 38

OPTICAL LENS SET

CROSS REFERENCE TO RELATED APPLICATION

This application claims priority from Chinese patent application No. 201610947936.4, filed on Nov. 2, 2016. The contents of which are hereby incorporated by reference in their entirety for all purposes.

BACKGROUND OF THE INVENTION

1. Field of the Invention

The present invention generally relates to an optical imaging lens set for use in taking pictures and in recording videos. Specifically speaking, the present invention is directed to an optical imaging lens set for use in mobile phones, in cameras, in tablet personal computers, or in personal digital assistants (PDA) to take pictures and to record videos.

2. Description of the Prior Art

In recent years, the popularity of mobile phones and digital cameras makes the sizes of various portable electronic products reduce quickly, and so does those of the photography modules to meet the demands. The current trend of research is to develop an optical imaging lens set of a shorter total length with uncompromised good imaging quality. However, good and necessary optical properties, such as the system aberration improvement, as well as production cost and production feasibility should be taken into consideration, too.

As far as an optical imaging lens set of six lens elements is concerned, currently the distance between an object-side surface of the first lens element to an image plane, namely the total length TTL of an optical imaging lens set, is too long to shrink mobile phones and digital cameras. The designing of the optical lens is not just scaling down the optical lens which has good optical performance, but also needs to consider the material characteristics and satisfy some practical requirements like assembly yield.

Accordingly, it is more difficult to diminish a mini-lens than to diminish a conventional lens. Therefore, how to reduce the total length of a photographic device, but still maintain good optical performance under dim light background, is an important objective to research.

SUMMARY OF THE INVENTION

In light of the above, the present invention proposes an optical imaging lens set of six lens elements that is smaller in total length, technically possible, has low flare and good optical performance. The optical imaging lens set of six lens elements of the present invention from an object side toward an image side in order along an optical axis has a first lens element, a second lens element, a third lens element, a fourth lens element, a fifth lens element and a sixth lens element. Each lens element has an object-side surface facing toward an object side as well as an image-side surface facing toward an image side. The optical imaging lens set exclusively has the first lens element, the second lens element, the third lens element, the fourth lens element, the fifth lens element and the sixth lens element with refractive power.

There is no air gap disposed between the first lens element and the second lens element. The third lens element has an object-side surface with a concave portion in a vicinity of the optical axis. The sixth lens element has an image-side surface with a convex portion in a vicinity of its periphery. An Abbe number v3 of the third lens element and an Abbe number v5 of the fifth lens element satisfy $|v3-v5| \leq 25$.

In the optical imaging lens set of six lens elements of the present invention, the second lens element has a second lens element thickness $T_2$ along the optical axis and the third lens element has a third lens element thickness $T_3$ along the optical axis to satisfy $T_3/T_2 \leq 2.7$.

In the optical imaging lens set of six lens elements of the present invention, EFL is an effective focal length of the optical imaging lens set, an air gap $G_{34}$ between the third lens element and the fourth lens element along the optical axis and an air gap $G_{55}$ between the fifth lens element and the sixth lens element along the optical axis to satisfy $EFL/(G_{34}+G_{56}) \leq 42.3$.

In the optical imaging lens set of six lens elements of the present invention, the fifth lens element has a fifth lens element thickness $T_5$ along the optical axis to satisfy $T_5/(G_{34}+G_{56}) \leq 6$.

In the optical imaging lens set of six lens elements of the present invention, BFL is a distance between the image-side surface of the sixth lens element and an image plane along the optical axis to satisfy $BFL/(G_{34}+G_{56}) \leq 8.1$.

The optical imaging lens set of six lens elements of the present invention satisfies $T_2/G_{56} \leq 1.8$.

In the optical imaging lens set of six lens elements of the present invention, a sum of all air gaps AAG between each lens elements from the first lens element to the sixth lens element along the optical axis satisfies $AAG/G_{56} \leq 9.1$.

In the optical imaging lens set of six lens elements of the present invention, the sixth lens element has a sixth lens element thickness $T_6$ along the optical axis to satisfy $EFL/T_6 \leq 11.7$.

In the optical imaging lens set of six lens elements of the present invention, the first lens element has a first lens element thickness $T_1$ along the optical axis and an air gap $G_{45}$ between the fourth lens element and the fifth lens element along the optical axis to satisfy $T_1/G_{45} \leq 6.6$.

In the optical imaging lens set of six lens elements of the present invention, ALT is a total thickness of all six lens elements and the fourth lens element has a fourth lens element thickness $T_4$ along the optical axis to satisfy $ALT/T_4 \leq 13.1$.

The optical imaging lens set of six lens elements of the present invention satisfies $EFL/BFL \leq 4.9$.

The optical imaging lens set of six lens elements of the present invention satisfies $T_6/T_4 \leq 2.4$.

In the optical imaging lens set of six lens elements of the present invention, TTL is a distance from the object-side surface of the first lens element to an image plane to satisfy $TTL/AAG \leq 6.1$.

The optical imaging lens set of six lens elements of the present invention satisfies $ALT/T_6 \leq 6.9$.

In the optical imaging lens set of six lens elements of the present invention, an air gap $G_{23}$ between the second lens element and the third lens element along the optical axis satisfies $T_1/G_{23} \leq 2.2$.

In the optical imaging lens set of six lens elements of the present invention, TL is a distance between the object-side surface of the first lens element and the image-side surface of the sixth lens element along the optical axis to satisfy $TTL/TL \leq 1.4$.

The optical imaging lens set of six lens elements of the present invention satisfies $TL/T_4 \leq 17.2$.

The optical imaging lens set of six lens elements of the present invention satisfies $BFL/T_6 \leq 2.6$.

The optical imaging lens set of six lens elements of the present invention satisfies $ALT/BFL \leq 3.5$.

The optical imaging lens set of six lens elements of the present invention satisfies $EFL/G_{23} \leq 8.7$.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrates the methods for determining the surface shapes and for determining one region is a region in a vicinity of the optical axis or the region in a vicinity of its circular periphery of one lens element.

FIG. 22 shows the optical data of the first example of the optical imaging lens set.

FIG. 23 shows the aspheric surface data of the first example.

FIG. 24 shows the optical data of the second example of the optical imaging lens set.

FIG. 25 shows the aspheric surface data of the second example.

FIG. 26 shows the optical data of the third example of the optical imaging lens set.

FIG. 27 shows the aspheric surface data of the third example.

FIG. 28 shows the optical data of the fourth example of the optical imaging lens set.

FIG. 29 shows the aspheric surface data of the fourth example.

FIG. 30 shows the optical data of the fifth example of the optical imaging lens set.

FIG. 31 shows the aspheric surface data of the fifth example.

FIG. 32 shows the optical data of the sixth example of the optical imaging lens set.

FIG. 33 shows the aspheric surface data of the sixth example.

FIG. 34 shows the optical data of the seventh example of the optical imaging lens set.

FIG. 35 shows the aspheric surface data of the seventh example.

FIG. 36 shows the optical data of the eighth example of the optical imaging lens set.

FIG. 37 shows the aspheric surface data of the eighth example.

FIG. 38 shows some important ratios in the examples.

DETAILED DESCRIPTION

Figure 1:
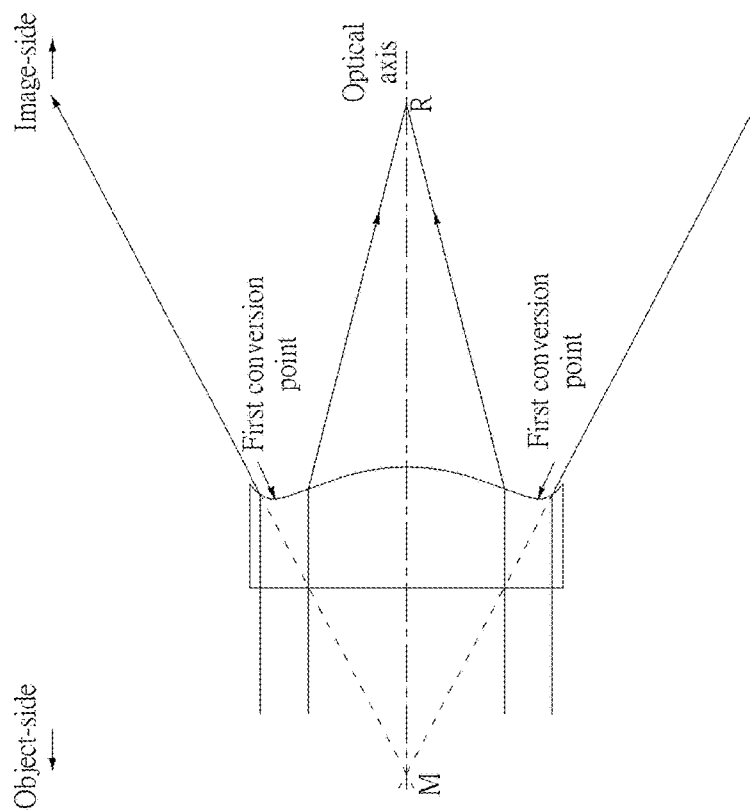

Before the detailed description of the present invention, the first thing to be noticed is that in the present invention, similar (not necessarily identical) elements are labeled as the same numeral references. In the entire present specification, "a certain lens element has negative/positive refractive power" refers to the part in a vicinity of the optical axis of the lens element has negative/positive refractive power calculated by Gaussian optical theory. An object-side/image-side surface refers to the region which allows imaging light passing through, in the drawing, imaging light includes Lc (chief ray) and Lm (marginal ray). As shown in FIG. 1, the optical axis is "I" and the lens element is symmetrical with respect to the optical axis I. The region A that near the optical axis and for light to pass through is the region in a vicinity of the optical axis, and the region C that the marginal ray passing through is the region in a vicinity of a certain lens element's circular periphery. In addition, the lens element may include an extension part E for the lens element to be installed in an optical imaging lens set (that is the region outside the region C perpendicular to the optical axis). Ideally speaking, no light would pass through the extension part, and the actual structure and shape of the extension part is not limited to this and may have other variations. For the reason of simplicity, the extension part is not illustrated in the following examples. More, precisely, the method for determining the surface shapes or the region in a vicinity of the optical axis, the region in a vicinity of its circular periphery and other regions is described in the following paragraphs:

1. FIG. 1 is a radial cross-sectional view of a lens element. Before determining boundaries of those aforesaid portions, two referential points should be defined first, middle point and conversion point. The middle point of a surface of a lens element is a point of intersection of that surface and the optical axis. The conversion point is a point on a surface of a lens element, where the tangent line of that point is perpendicular to the optical axis. Additionally, if multiple conversion points appear on one single surface, then these conversion points are sequentially named along the radial direction of the surface with numbers starting from the first conversion point. For instance, the first conversion point (closest one to the optical axis), the second conversion point, and the $N^{th}$ conversion point (farthest one to the optical axis within the scope of the clear aperture of the surface). The portion of a surface of the lens element between the middle point and the first conversion point is defined as the portion in a vicinity of the optical axis. The portion located radially outside of the $N^{th}$ conversion point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the conversion point(s). In addition, the radius of the clear aperture (or a so-called effective radius) of a surface is defined as the radial distance from the optical axis I to a point of intersection of the marginal ray Lm and the surface of the lens element.

Figure 2:
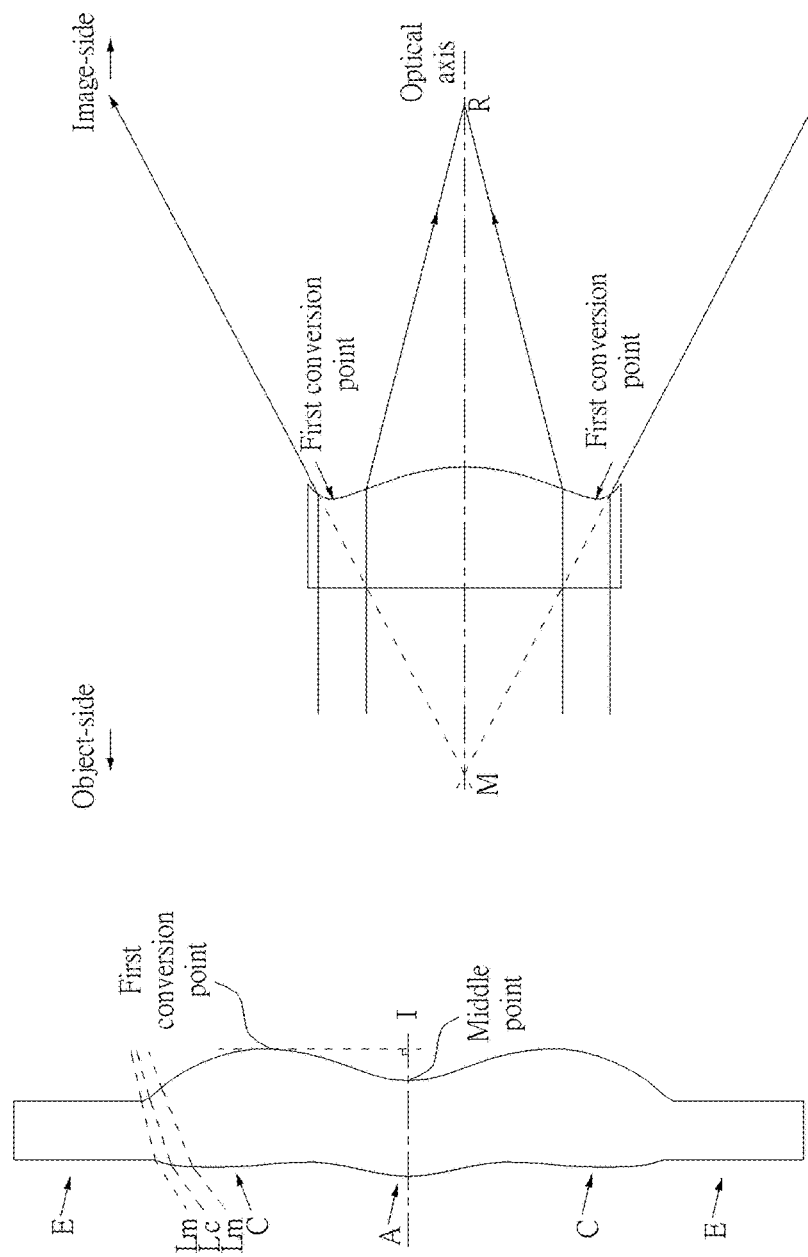

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the middle point and the first conversion point has a convex shape, the portion located radially outside of the first conversion point has a concave shape, and the first conversion point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none conversion point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one conversion point, namely a first conversion point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first conversion point and a second conversion point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second conversion point (portion II).

Referring to a third example depicted in FIG. 5, no conversion point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

Figure 6:
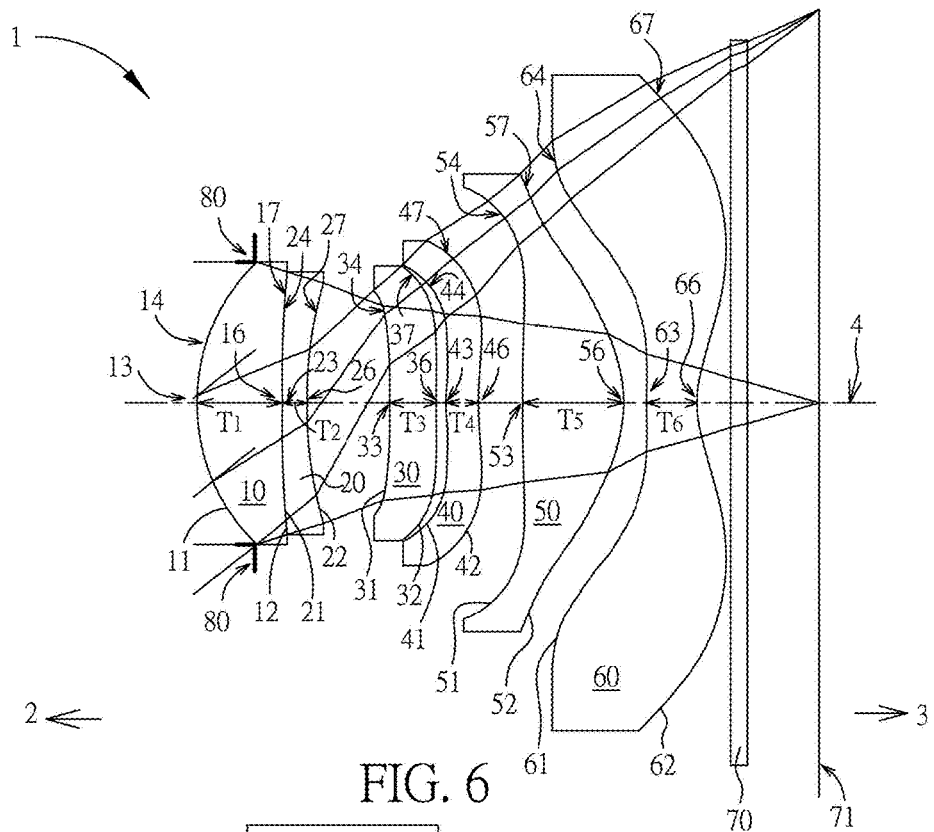
FIG. 6 illustrates a first example of the optical imaging lens set of the present invention.

As shown in FIG. 6, the optical imaging lens set 1 of six lens elements of the present invention, sequentially located from an object side 2 (where an object is located) to an image side 3 along an optical axis 4, has an aperture stop (ape. stop) 80, a first lens element 10, a second lens element 20, a third lens element 30, a fourth lens element 40, a fifth lens element 50, a sixth lens element 60, a filter 70 and an image plane 71. Generally speaking, the first lens element 10, the second lens element 20, the third lens element 30, the fourth lens element 40, the fifth lens element 50 and the sixth lens element 60 may be made of a transparent plastic material but the present invention is not limited to this, and each has an appropriate refractive power. There are exclusively six lens elements, which means the first lens element 10, the second lens element 20, the third lens element 30, the fourth lens element 40, the fifth lens element 50 and the sixth lens element 60, with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 6, the aperture stop 80 is disposed between the object side 2 and the first lens element 10. When light emitted or reflected by an object (not shown) which is located at the object side 2 enters the optical imaging lens set 1 of the present invention, it forms a clear and sharp image on the image plane 71 at the image side 3 after passing through the aperture stop 80, the first lens element 10, the second lens element 20, the third lens element 30, the fourth lens element 40, the fifth lens element 50, the sixth lens element 60 and the filter 70. In one embodiments of the present invention, the optional filter 70 may be a filter of various suitable functions, for example, the filter 70 may be an infrared cut filter (IR cut filter), placed between the image-side surface 62 of the sixth lens element 60 and the image plane 71.

Each lens element in the optical imaging lens set 1 of the present invention has an object-side surface facing toward the object side 2 as well as an image-side surface facing toward the image side 3. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52; the sixth lens element 60 has an object-side surface 61 and an image-side surface 62. In addition, each object-side surface and image-side surface in the optical imaging lens set 1 of the present invention has a part (or portion) in a vicinity of its periphery (circular periphery part) away from the optical axis 4 as well as a part in a vicinity of the optical axis (optical axis part) close to the optical axis 4.

Each lens element in the optical imaging lens set 1 of the present invention further has a central thickness T on the optical axis 4. For example, the first lens element 10 has a first lens element thickness $T_1$, the second lens element 20 has a second lens element thickness $T_2$, the third lens element 30 has a third lens element thickness $T_3$, the fourth lens element 40 has a fourth lens element thickness $T_4$, the fifth lens element 50 has a fifth lens element thickness $T_5$, the sixth lens element 60 has a sixth lens element thickness $T_5$. Therefore, the total thickness of all the lens elements in the optical imaging lens set 1 along the optical axis 4 is $ALT=T_1+T_2+T_3+T_4+T_5+T_6$.

In addition, between two adjacent lens elements in the optical imaging lens set 1 of the present invention there may be an air gap along the optical axis 4. For example, there is no air gap $G_{12}$ disposed between the first lens element 10 and the second lens element 20 so $G_{12}$ is 0. There is an air gap $G_{23}$ is disposed between the second lens element 20 and the third lens element 30, an air gap $G_{34}$ is disposed between the third lens element 30 and the fourth lens element 40, an air gap $G_{45}$ is disposed between the fourth lens element 40 and the fifth lens element 50 as well as an air gap $G_{56}$ is disposed between the fifth lens element 50 and the sixth lens element 60. Therefore, the sum of total four air gaps between adjacent lens elements from the first lens element 10 to the sixth lens element 60 along the optical axis 4 is $AAG=G_{23}+G_{34}+G_{45}+G_{56}$.

In addition, the distance from the object-side surface 11 of the first lens element 10 to the image-side surface 62 of the sixth lens element 60 along the optical axis 4 is TL. The distance between the object-side surface 11 of the first lens element 10 to the image plane 71, namely the total length of the optical imaging lens set along the optical axis 4 is TTL; the effective focal length of the optical imaging lens set is EFL; the distance between the image-side surface 62 of the sixth lens element 60 and the image plane 71 along the optical axis 4 is BFL.

Furthermore, the focal length of the first lens element 10 is f1; the focal length of the second lens element 20 is f2; the focal length of the third lens element 30 is f3; the focal length of the fourth lens element 40 is f4; the focal length of the fifth lens element 50 is f5; the focal length of the sixth lens element 60 is f6; the refractive index of the first lens element 10 is n1; the refractive index of the second lens element 20 is n2; the refractive index of the third lens element 30 is n3; the refractive index of the fourth lens element 40 is n4; the refractive index of the fifth lens element 50 is n5; the refractive index of the sixth lens element 60 is n6; the Abbe number of the first lens element 10 is v1; the Abbe number of the second lens element 20 is v2; the Abbe number of the third lens element 30 is v3; and the Abbe number of the fourth lens element 40 is v4; the Abbe number of the fifth lens element 50 is v5; and the Abbe number of the sixth lens element 60 is v6.

First Example

Figures 7A, 7B, 7C, 7D:
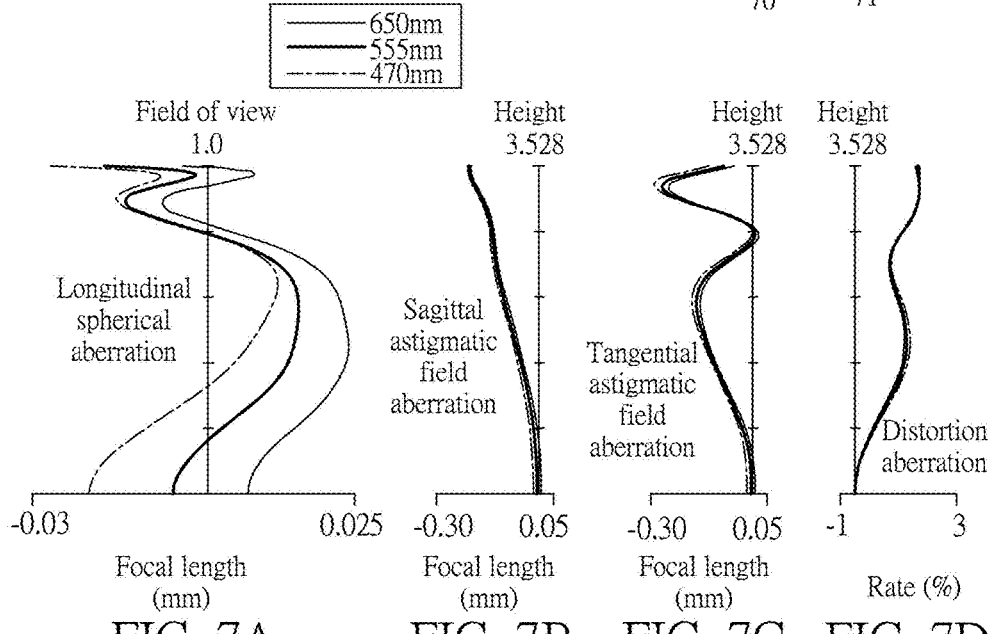
FIG. 7A illustrates the longitudinal spherical aberration on the image plane of the first example.
FIG. 7B illustrates the astigmatic aberration on the sagittal direction of the first example.
FIG. 7C illustrates the astigmatic aberration on the tangential direction of the first example.
FIG. 7D illustrates the distortion aberration of the first example.

Please refer to FIG. 6 which illustrates the first example of the optical imaging lens set 1 of the present invention. Please refer to FIG. 7A for the longitudinal spherical aberration on the image plane 71 of the first example; please refer to FIG. 7B for the astigmatic field aberration on the sagittal direction; please refer to FIG. 7C for the astigmatic field aberration on the tangential direction, and please refer to FIG. 7D for the distortion aberration. The Y axis of the spherical aberration in each example is "field of view" for 1.0. The Y axis of the astigmatic field and the distortion in each example stands for "image height", which is 3.528 mm.

The optical imaging lens set 1 of the first example has six lens elements 10 to 60 with refractive power. The optical imaging lens set 1 also has a filter 70, an aperture stop 80, and an image plane 71. The aperture stop 80 is provided between the object side 2 and the first lens element 10. The filter 70 may be used for preventing specific wavelength light (such as the infrared light) reaching the image plane to adversely affect the imaging quality.

The first lens element 10 has positive refractive power. The object-side surface 11 facing toward the object side 2 has a convex part 13 in the vicinity of the optical axis and a convex part 14 in a vicinity of its periphery. The image-side surface 12 facing toward the image side 3 has a concave part 16 in the vicinity of the optical axis and a concave part 17 in a vicinity of its periphery. Besides, the object-side surface 11 is an aspherical surface.

The second lens element 20 has negative refractive power. The object-side surface 21 facing toward the object side 2 has a convex part 23 in the vicinity of the optical axis and a convex part 24 in a vicinity of its periphery. The image-side surface 22 facing toward the image side 3 has a concave part 26 in the vicinity of the optical axis and a concave part 27 in a vicinity of its periphery. The image-side 22 of the second lens element 20 is an aspherical surface. The first lens element 10 and the second lens element 20 may be glued together so there is no air gap between the image-side surface 12 of the first lens element 10 and the object-side surface 21 of the second lens element 20 to reduce the chance of flare.

The third lens element 30 has negative refractive power. The object-side surface 31 facing toward the object side 2 has a concave part 33 in the vicinity of the optical axis and a concave part 34 in a vicinity of its periphery. The image-side surface 32 facing toward the image side 3 has a concave part 36 in the vicinity of the optical axis and a convex part 37 in a vicinity of its periphery. Both the object-side surface 31 and the image-side 32 of the third lens element 30 are aspherical surfaces.

The fourth lens element 40 has negative refractive power. The object-side surface 41 facing toward the object side 2 has a convex part 43 in the vicinity of the optical axis and a concave part 44 in a vicinity of its periphery. The image-side surface 42 facing toward the image side 3 has a concave part 46 in the vicinity of the optical axis and a convex part 47 in a vicinity of its periphery. Both the object-side surface 41 and the image-side 42 of the fourth lens element 40 are aspherical surfaces.

The fifth lens element 50 has positive refractive power. The object-side surface 51 facing toward the object side 2 has a convex part 53 in the vicinity of the optical axis and a concave part 54 in a vicinity of its periphery. The image-side surface 52 facing toward the image side 3 has a convex part 56 in the vicinity of the optical axis and a convex part 57 in a vicinity of its periphery. Both the object-side surface 51 and the image-side 52 of the fifth lens element 50 are aspherical surfaces.

The sixth lens element 60 has negative refractive power. The object-side surface 61 facing toward the object side 2 has a convex part 63 in the vicinity of the optical axis and a concave part 64 in a vicinity of its periphery. The image-side surface 62 facing toward the image side 3 has a concave part 66 in the vicinity of the optical axis and a convex part 67 in a vicinity of its periphery. Both the object-side surface 61 and the image-side 62 of the sixth lens element 60 are aspherical surfaces. The filter 70 is disposed between the image-side 62 of the sixth lens element 60 and the image plane 71.

In the first lens element 10, the second lens element 20, the third lens element 30, the fourth lens element 40, the fifth lens element 50 and the sixth lens element 60 of the optical imaging lens element 1 of the present invention, there are 12 surfaces, such as the object-side surfaces 11/21/31/41/51/61 and the image-side surfaces 12/22/32/42/52/62. If a surface is aspherical, these aspheric coefficients are defined according to the following formula:

$$Z(Y) = \frac{Y^2}{R} \bigg/ \left(1 + \sqrt{1 - (1+K)\frac{Y^2}{R^2}}\right) + \sum_{i=1}^{n} a_i \times Y^i$$

In which:
R represents the curvature radius of the lens element surface;
Z represents the depth of an aspherical surface (the perpendicular distance between the point of the aspherical surface at a distance Y from the optical axis and the tangent plane of the vertex on the optical axis of the aspherical surface);
Y represents a vertical distance from a point on the aspherical surface to the optical axis;
K is a conic constant;
$a_i$ is the aspheric coefficient of the $i^{th}$ order.

The optical data of the first example of the optical imaging lens set 1 are shown in FIG. 22 while the aspheric surface data are shown in FIG. 23. In the present examples of the optical imaging lens set, the f-number of the entire optical lens element system is Fno, EFL is the effective focal length, HFOV stands for the half field of view which is half of the field of view of the entire optical lens element system, and the unit for the curvature radius, the thickness and the focal length is in millimeters (mm). TTL is 5.5379 mm. Fno is 1.6689. The image height is 3.528 mm. HFOV is 38.4693 degrees.

Second Example

Figure 8:
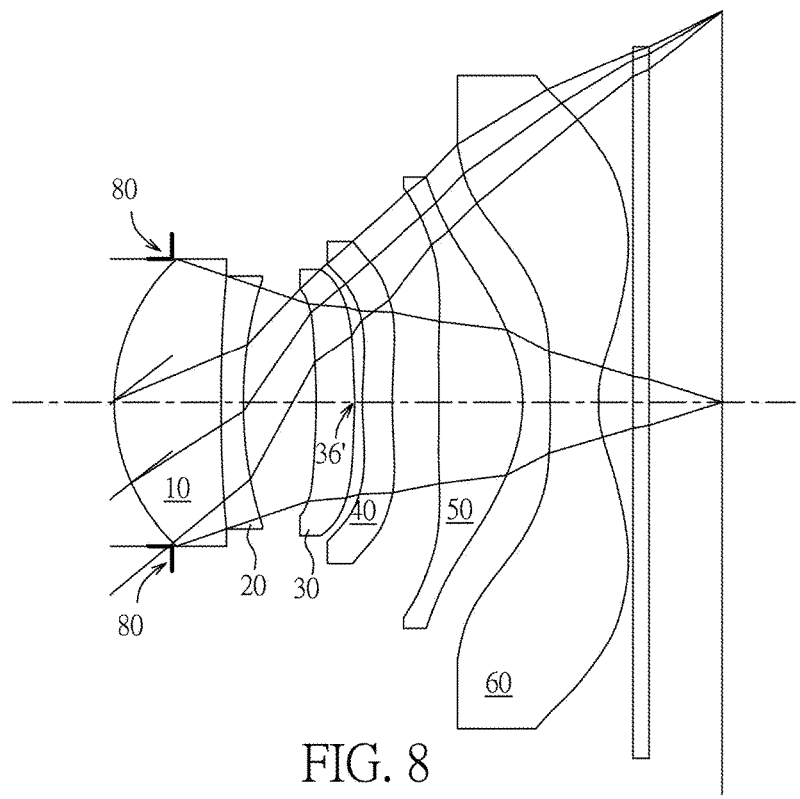
FIG. 8 illustrates a second example of the optical imaging lens set of six lens elements of the present invention.
Figures 9A, 9B, 9C, 9D:
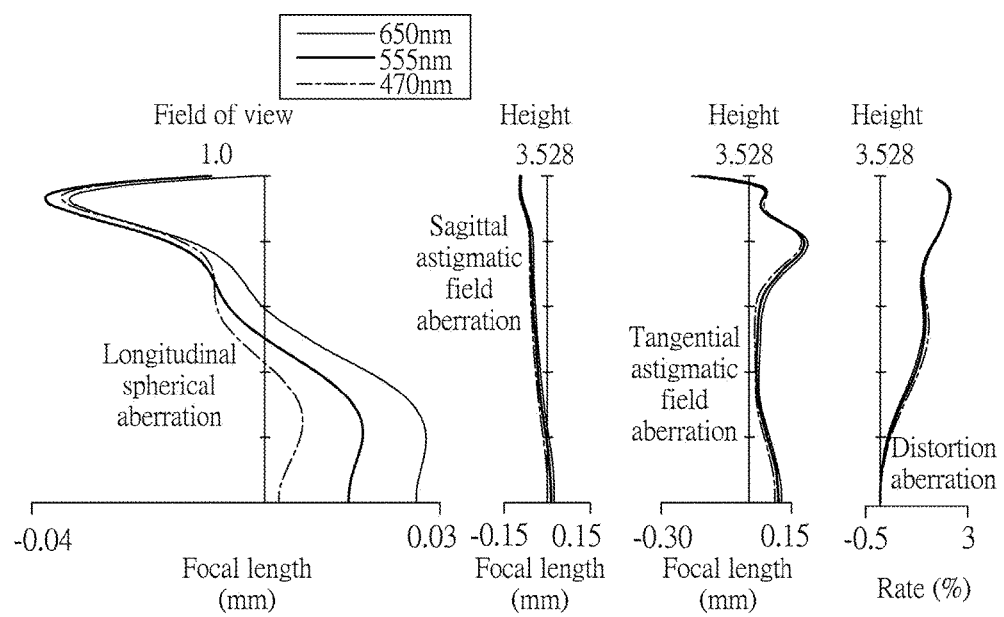
FIG. 9A illustrates the longitudinal spherical aberration on the image plane of the second example.
FIG. 9B illustrates the astigmatic aberration on the sagittal direction of the second example.
FIG. 9C illustrates the astigmatic aberration on the tangential direction of the second example.
FIG. 9D illustrates the distortion aberration of the second example.

Please refer to FIG. 8 which illustrates the second example of the optical imaging lens set 1 of the present invention. It is noted that from the second example to the following examples, in order to simplify the figures, only the components different from what the first example has, and the basic lens elements will be labeled in figures. Other components that are the same as what the first example has, such as the object-side surface, the image-side surface, the part in a vicinity of the optical axis and the part in a vicinity of its periphery will be omitted in the following examples. Please refer to FIG. 9A for the longitudinal spherical aberration on the image plane 71 of the second example, please refer to FIG. 9B for the astigmatic aberration on the sagittal direction, please refer to FIG. 9C for the astigmatic aberration on the tangential direction, and please refer to FIG. 9D for the distortion aberration. The components in the second example are similar to those in the first example, but the optical data such as the curvature radius, the refractive power, the lens thickness, the lens focal length, the aspheric surface or the back focal length in this example are different from the optical data in the first example, and in this example, image-side surface 32 facing toward the image side 3 of the third lens element 30 has a convex part 36' in the vicinity of the optical axis.

The optical data of the second example of the optical imaging lens set are shown in FIG. 24 while the aspheric surface data are shown in FIG. 25. TTL is 5.4423 mm. Fno is 1.6661. The image height is 3.528 mm. HFOV is 38.2839 degrees. In particular, 1) the Fno of the second example is smaller than that of the first example of the present invention, 2) the image quality of the second example is better than that of the first example of the present invention, and 3) the fabrication of the second example is easier than the first example so the yield is better.

Third Example

Figure 10:
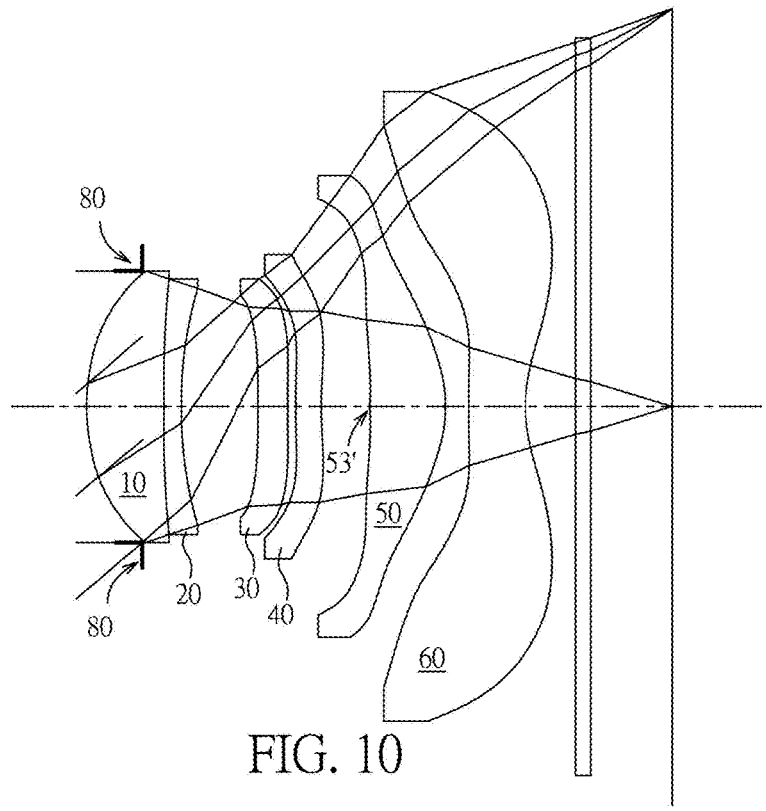
FIG. 10 illustrates a third example of the optical imaging lens set of six lens elements of the present invention.
Figures 11A, 11B, 11C, 11D:
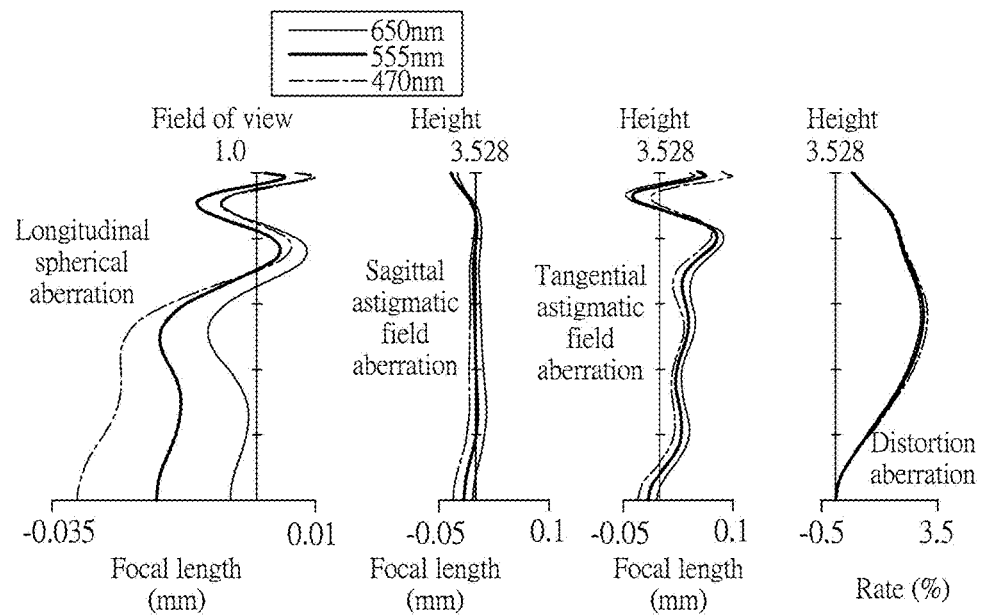
FIG. 11A illustrates the longitudinal spherical aberration on the image plane of the third example.
FIG. 11B illustrates the astigmatic aberration on the sagittal direction of the third example.
FIG. 11C illustrates the astigmatic aberration on the tangential direction of the third example.
FIG. 11D illustrates the distortion aberration of the third example.

Please refer to FIG. 10 which illustrates the third example of the optical imaging lens set 1 of the present invention. Please refer to FIG. 11A for the longitudinal spherical aberration on the image plane 71 of the third example; please refer to FIG. 11B for the astigmatic aberration on the sagittal direction; please refer to FIG. 11C for the astigmatic aberration on the tangential direction, and please refer to FIG. 11D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this example, the object-side surface 51 facing toward the object side 2 of the fifth lens element 50 has a concave part 53' in the vicinity of the optical axis.

The optical data of the third example of the optical imaging lens set are shown in FIG. 26 while the aspheric surface data are shown in FIG. 27. TTL is 5.4403 mm. Fno is 1.7302. The image height is 3.528 mm. HFOV is 38.9046 degrees. In particular, 1) the TTL of the third example is shorter than that of the first example of the present invention, 2) the HFOV of the third example is better than that of the first example of the present invention, 3) the image quality of the third example is better than that of the first example of the present invention, and 4) the fabrication of the third example is easier than the first example so the yield is better.

Fourth Example

Figure 12:
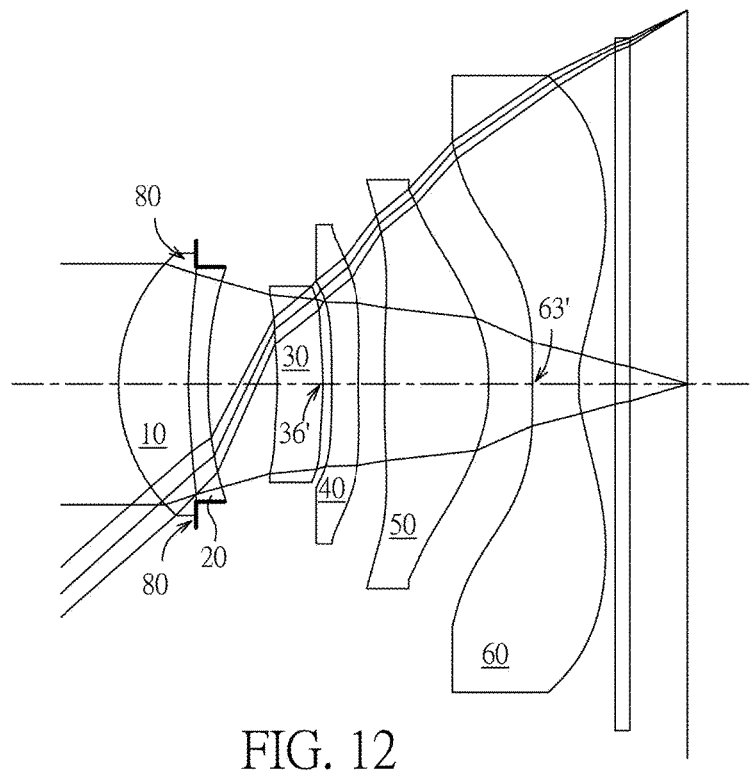
FIG. 12 illustrates a fourth example of the optical imaging lens set of six lens elements of the present invention.
Figures 13A, 13B, 13C, 13D:
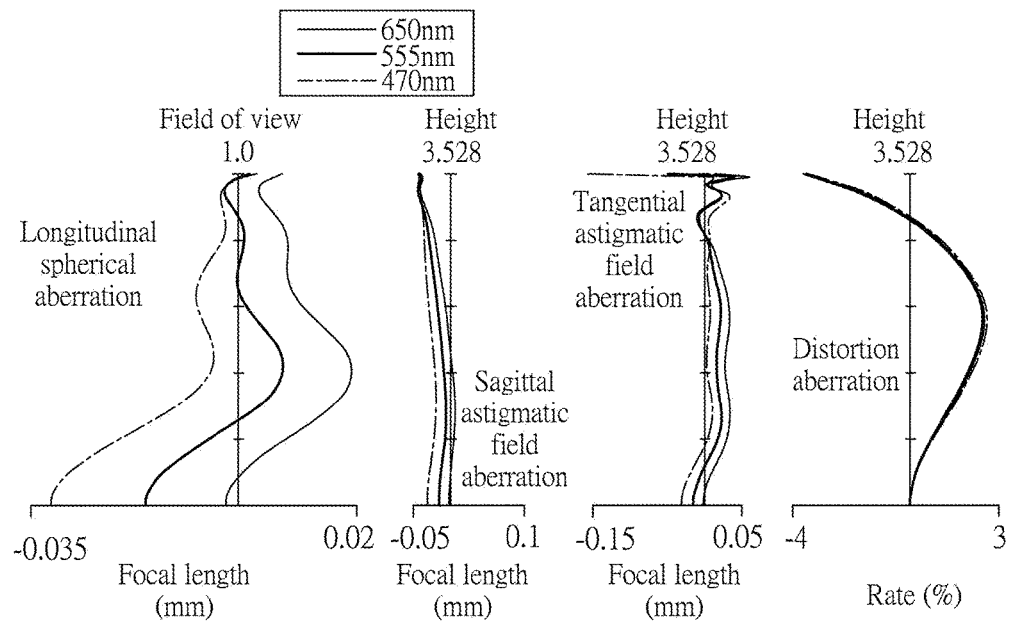
FIG. 13A illustrates the longitudinal spherical aberration on the image plane of the fourth example.
FIG. 13B illustrates the astigmatic aberration on the sagittal direction of the fourth example.
FIG. 13C illustrates the astigmatic aberration on the tangential direction of the fourth example.
FIG. 13D illustrates the distortion aberration of the fourth example.

Please refer to FIG. 12 which illustrates the fourth example of the optical imaging lens set 1 of the present invention. Please refer to FIG. 13A for the longitudinal spherical aberration on the image plane 71 of the fourth example; please refer to FIG. 13B for the astigmatic aberration on the sagittal direction; please refer to FIG. 13C for the astigmatic aberration on the tangential direction, and please refer to FIG. 13D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the aperture stop 80 is provided between the first lens element 10 and the second lens element 20, the image-side surface 32 facing the image side 3 of the third lens element 30 has a convex part 36' in the vicinity of the optical axis, the object-side surface 61 facing toward the object side 2 of the sixth lens element 60 has a concave part 63' in the vicinity of the optical axis. The aperture stop 80 provided between the first lens element 10 and the second lens element 20 makes the field angle larger so the imaging quality is better.

The optical data of the fourth example of the optical imaging lens set are shown in FIG. 28 while the aspheric surface data are shown in FIG. 29. TTL is 5.3949 mm. Fno is 1.8103. The image height is 3.528 mm. HFOV is 41.7104 degrees. In particular, 1) the TTL of the fourth example is shorter than that of the first example of the present invention, 2) the location of the aperture stop of the fourth example is different from that of the first example, 3) the image quality of the fourth example is better than that of the first example of the present invention, and 4) the fabrication of the fourth example is easier than the first example so the yield is better.

Fifth Example

Figure 14:
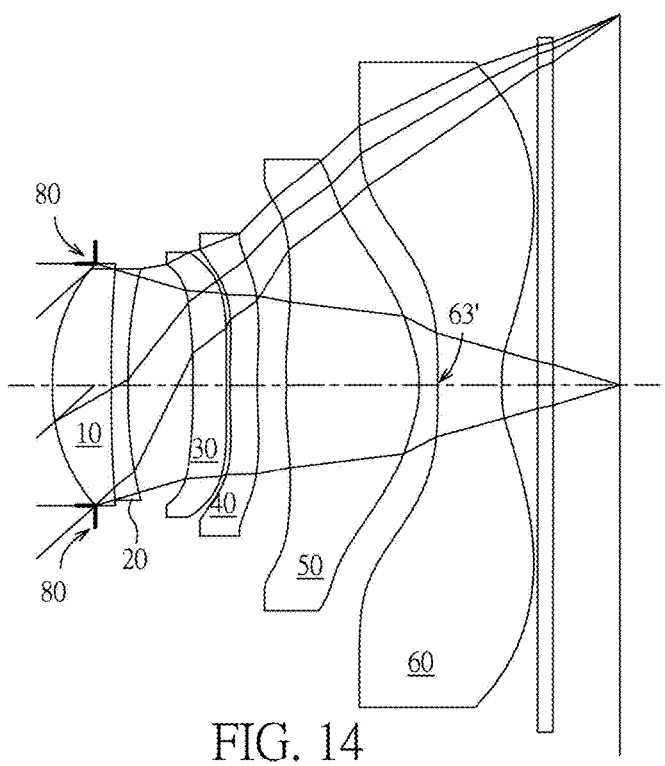
FIG. 14 illustrates a fifth example of the optical imaging lens set of six lens elements of the present invention.
Figures 15A, 15B, 15C, 15D:
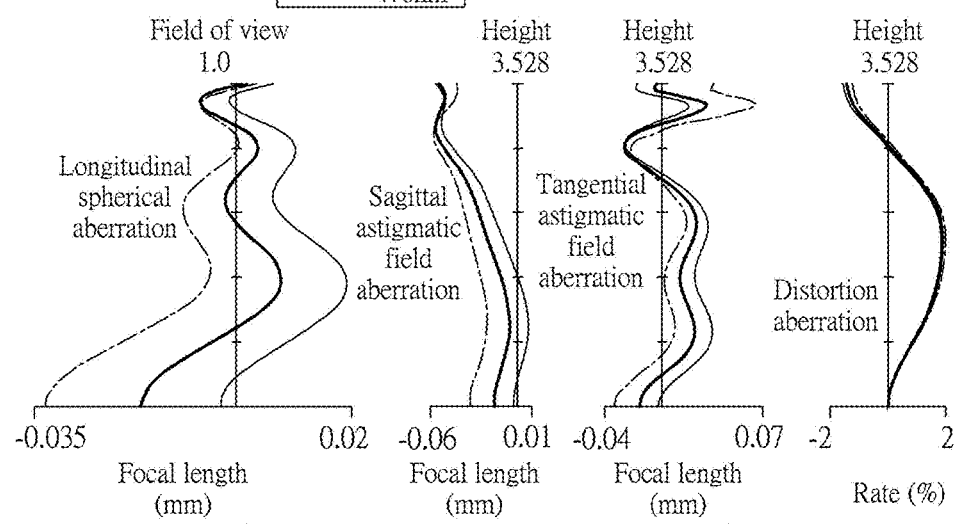
FIG. 15A illustrates the longitudinal spherical aberration on the image plane of the fifth example.
FIG. 15B illustrates the astigmatic aberration on the sagittal direction of the fifth example.
FIG. 15C illustrates the astigmatic aberration on the tangential direction of the fifth example.
FIG. 15D illustrates the distortion aberration of the fifth example.

Please refer to FIG. 14 which illustrates the fifth example of the optical imaging lens set 1 of the present invention. Please refer to FIG. 15A for the longitudinal spherical aberration on the image plane 71 of the fifth example; please refer to FIG. 15B for the astigmatic aberration on the sagittal direction; please refer to FIG. 15C for the astigmatic aberration on the tangential direction, and please refer to FIG. 15D for the distortion aberration. The components in the fifth example are similar to those in the first example, but the optical data such as the curvature radius, the refractive power, the lens thickness, the lens focal length, the aspheric surface or the back focal length in this example are different from the optical data in the first example, and in this example, the object-side surface 61 facing toward the object side 2 of the sixth lens element 60 has a concave part 63' in the vicinity of the optical axis.

The optical data of the fifth example of the optical imaging lens set are shown in FIG. 30 while the aspheric surface data are shown in FIG. 31. TTL is 5.4151 mm. Fno is 1.7232. The image height is 3.528 mm. HFOV is 42.2274 degrees. In particular, 1) the TTL of the fifth example is shorter than that of the first example of the present invention, 2) the HFOV of the fifth example is better than that of the first example of the present invention, 3) the imaging quality of the fifth example is better than that of the first example of the present invention, and 4) the fabrication of the fifth example is easier than the first example so the yield is better.

Sixth Example

Figure 16:
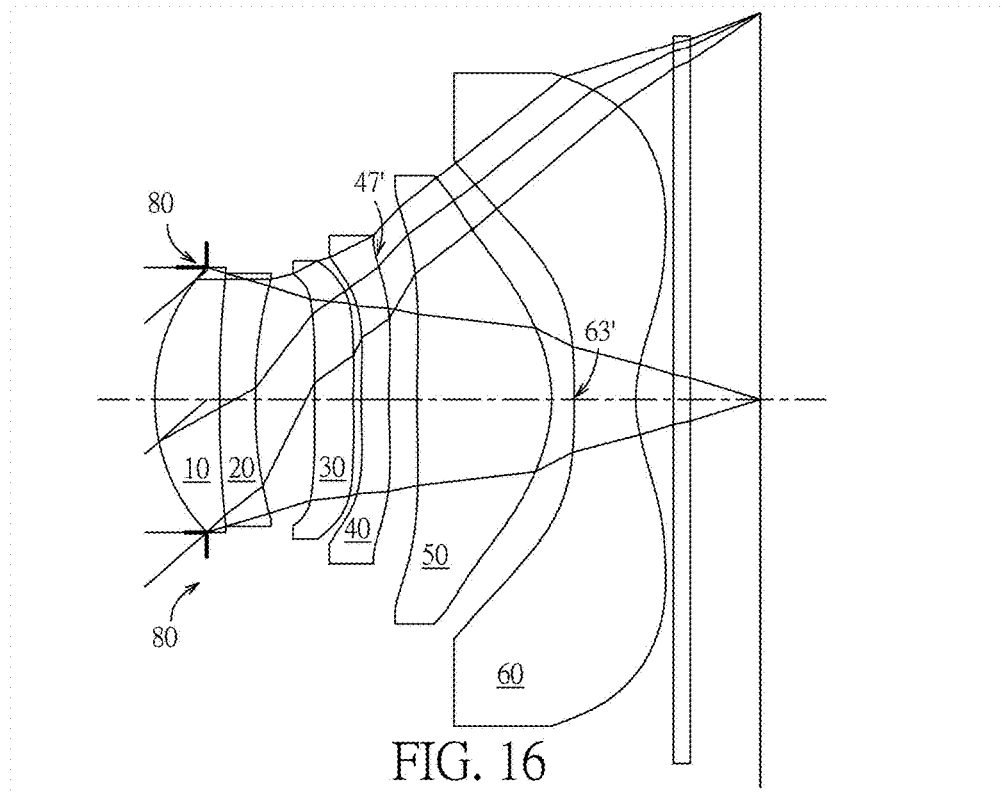
FIG. 16 illustrates a sixth example of the optical imaging lens set of six lens elements of the present invention.
Figures 17A, 17B, 17C, 17D:
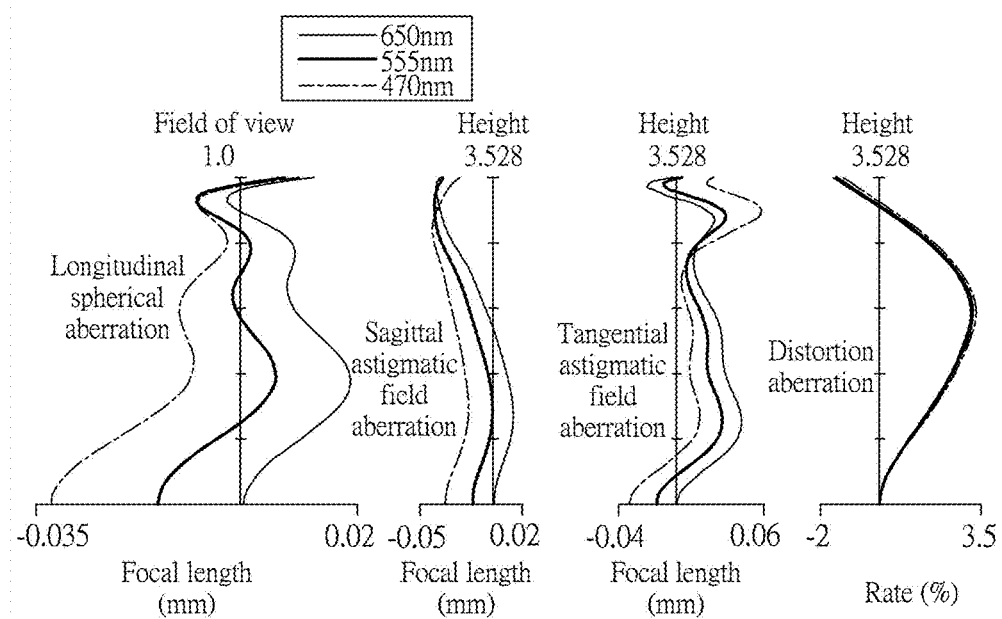
FIG. 17A illustrates the longitudinal spherical aberration on the image plane of the sixth example.
FIG. 17B illustrates the astigmatic aberration on the sagittal direction of the sixth example.
FIG. 17C illustrates the astigmatic aberration on the tangential direction of the sixth example.
FIG. 17D illustrates the distortion aberration of the sixth example.

Please refer to FIG. 16 which illustrates the sixth example of the optical imaging lens set 1 of the present invention. Please refer to FIG. 17A for the longitudinal spherical aberration on the image plane 71 of the sixth example; please refer to FIG. 17B for the astigmatic aberration on the sagittal direction; please refer to FIG. 17C for the astigmatic aberration on the tangential direction, and please refer to FIG. 17D for the distortion aberration. The components in the sixth example are similar to those in the first example, but the optical data such as the curvature radius, the refractive power, the lens thickness, the lens focal length, the aspheric surface or the back focal length in this example are different from the optical data in the first example, and in this example, the image-side surface 42 facing toward the image side 3 of the fourth lens element 40 has a concave part 47' in a vicinity of its periphery and the object-side surface 61 facing toward the object side 2 of the sixth lens element 60 has a concave part 63' in the vicinity of the optical axis.

The optical data of the sixth example of the optical imaging lens set are shown in FIG. 34 while the aspheric surface data are shown in FIG. 35. TTL is 5.4975 mm. Fno is 1.72289. The image height is 3.528 mm. HFOV is 40.8937 degrees. In particular, 1) the TTL of the sixth example is shorter than that of the first example of the present invention, 2) the HFOV of the sixth example is better than that of the first example of the present invention, 3) the imaging quality of the sixth example is better than that of the first example of the present invention, and 4) the fabrication of the sixth example is easier than the first example so the yield is better.

Seventh Example

Figure 18:
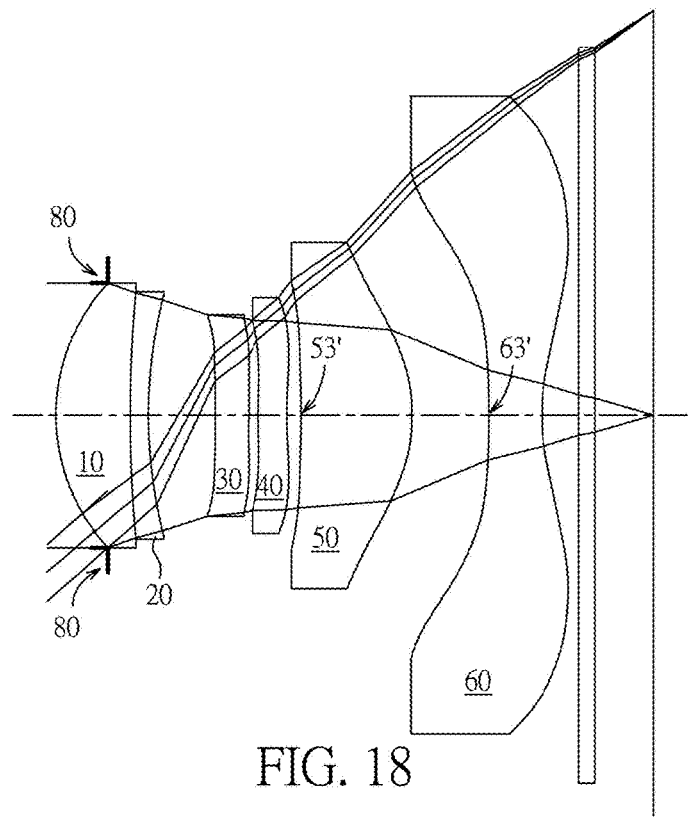
FIG. 18 illustrates a seventh example of the optical imaging lens set of six lens elements of the present invention.
Figures 19A, 19B, 19C, 19D:
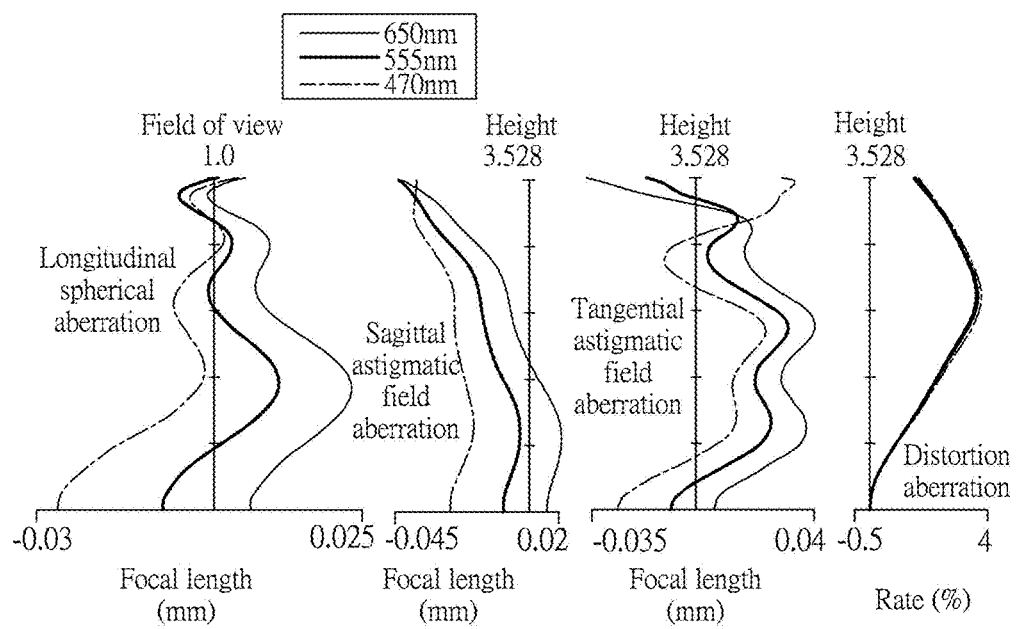
FIG. 19A illustrates the longitudinal spherical aberration on the image plane of the seventh example.
FIG. 19B illustrates the astigmatic aberration on the sagittal direction of the seventh example.
FIG. 19C illustrates the astigmatic aberration on the tangential direction of the seventh example.
FIG. 19D illustrates the distortion aberration of the seventh example.

Please refer to FIG. 18 which illustrates the seventh example of the optical imaging lens set 1 of the present invention. Please refer to FIG. 19A for the longitudinal spherical aberration on the image plane 71 of the seventh example; please refer to FIG. 19B for the astigmatic aberration on the sagittal direction; please refer to FIG. 19C for the astigmatic aberration on the tangential direction, and please refer to FIG. 19D for the distortion aberration. The components in the seventh example are similar to those in the first example, but the optical data such as the curvature radius, the refractive power, the lens thickness, the lens focal length, the aspheric surface or the back focal length in this example are different from the optical data in the first example, and in this example, the object-side surface 51 facing toward the object side 2 of the fifth lens element 50 has a concave part 53' in the vicinity of the optical axis and the object-side surface 61 facing toward the object side 2 of the sixth lens element 60 has a concave part 63' in the vicinity of the optical axis.

The optical data of the seventh example of the optical imaging lens set are shown in FIG. 36 while the aspheric surface data are shown in FIG. 37. TTL is 5.4927 mm. Fno is 1.7150. The image height is 3.528 mm. HFOV is 39.7529 degrees. In particular, 1) the HFOV of the seventh example is better than that of the first example of the present invention, 2) the image quality of the seventh example is better than that of the first example of the present invention, and 3) the fabrication of the seventh example is easier than the first example so the yield is better.

Eighth Example

Figure 20:
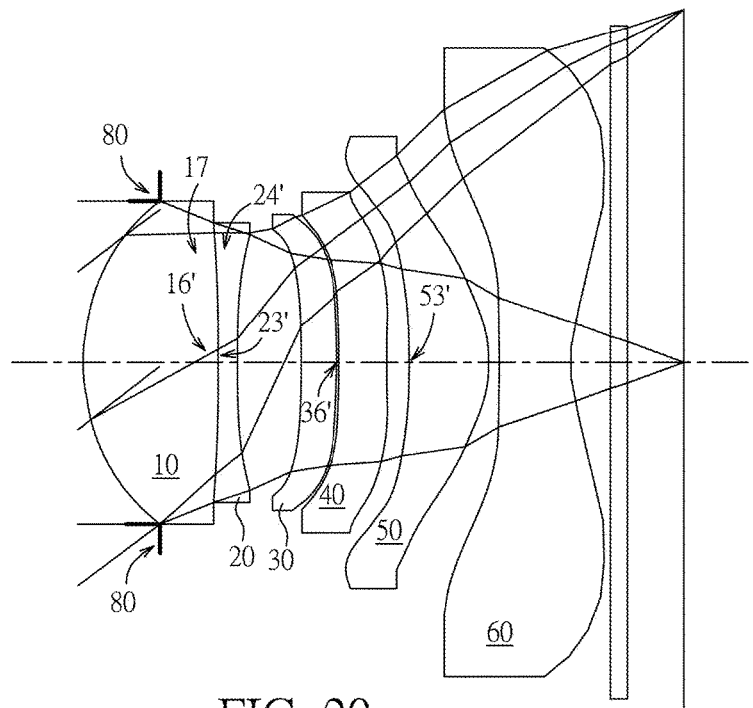
FIG. 20 illustrates an eighth example of the optical imaging lens set of six lens elements of the present invention.
Figures 21A, 21B, 21C, 21D:
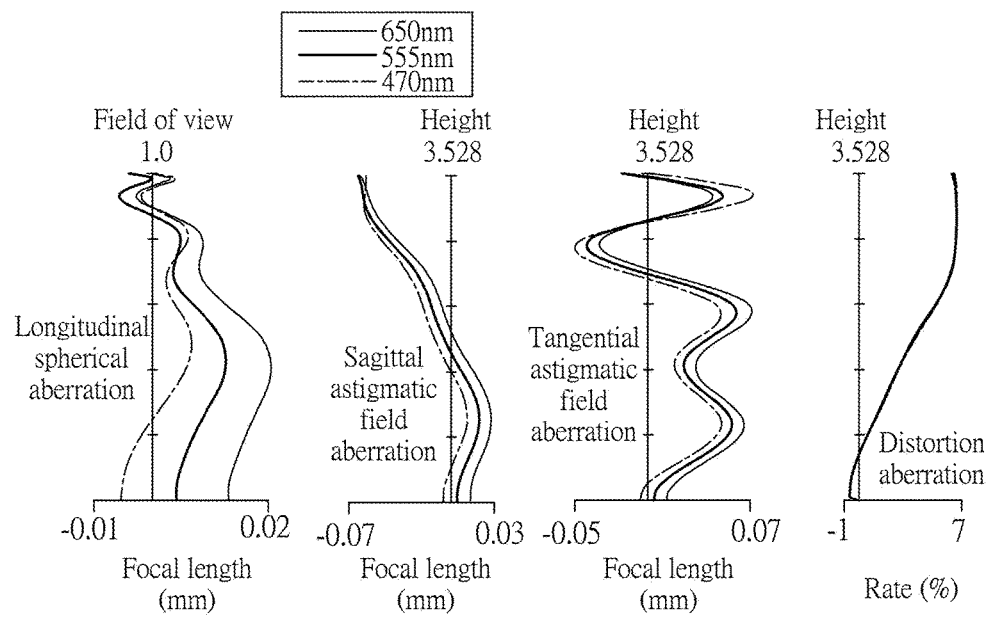
FIG. 21A illustrates the longitudinal spherical aberration on the image plane of the eighth example.
FIG. 21B illustrates the astigmatic aberration on the sagittal direction of the eighth example.
FIG. 21C illustrates the astigmatic aberration on the tangential direction of the eighth example.
FIG. 21D illustrates the distortion aberration of the eighth example.

Please refer to FIG. 20 which illustrates the eighth example of the optical imaging lens set 1 of the present invention. Please refer to FIG. 21A for the longitudinal spherical aberration on the image plane 71 of the eighth example; please refer to FIG. 21B for the astigmatic aberration on the sagittal direction; please refer to FIG. 21C for the astigmatic aberration on the tangential direction, and please refer to FIG. 21D for the distortion aberration. The components in the eighth example are similar to those in the first example, but the optical data such as the curvature radius, the refractive power, the lens thickness, the lens focal length, the aspheric surface or the back focal length in this example are different from the optical data in the first example, and in this example, the image-side surface 12 facing toward the image side 3 of the first lens element 10 has a convex part 16' in the vicinity of the optical axis and a convex part 17' in a vicinity of its periphery, the object-side surface 21 facing toward the object side 2 of the second lens element 20 has a concave part 23' in the vicinity of the optical axis and a concave part 24' in a vicinity of its periphery, the image-side surface 32 facing toward the image side 3 of the third lens element 30 has a convex part 36' in the vicinity of the optical axis and the object-side surface 51 facing toward the object side 2 of the fifth lens element 50 has a concave part 53' in the vicinity of the optical axis.

The optical data of the eighth example of the optical imaging lens set are shown in FIG. 36 while the aspheric surface data are shown in FIG. 37. TTL is 5.1147 mm. Fno is 1.3647. The image height is 3.528 mm. HFOV is 38.206 degrees. In particular, 1) the TTL of the eighth example is shorter than that of the first example of the present invention, 2) the Fno of the eighth example is better than that of the first example of the present invention, and 3) the fabrication of the eighth example is easier than the first example so the yield is better.

Some important ratios in each example are shown in FIG. 38. The distance between the image-side surface 62 of the sixth lens element 60 to the filter 70 along the optical axis 4 is G6F; the thickness of the filter 70 along the optical axis 4 is TF; the distance between the filter 70 to the image plane 71 along the optical axis 4 is GFP; the distance between the image-side surface 62 of the sixth lens element 60 and the image plane 71 along the optical axis 4 is BFL. Therefore, BFL=G6F+TF+GFP.

In the light of the above examples, the inventors observe at least the following features of the lens arrangement of the present invention and the corresponding efficacy:
1. The third lens element has an object-side surface with a concave portion in a vicinity of the optical axis, which facilitates the correction of the aberration of the first two optical imaging lens elements. When it goes with the sixth lens element which has an image-side surface with a convex portion in a vicinity of its periphery, they altogether further enhance the imaging quality of the optical imaging lens set.
2. The first lens element and the second lens element are glued together to render no air gap disposed between the first lens element and the second lens element to reduce flare.
3. The satisfaction of the conditional formula $|v3-v5|\le 25$, preferably $0\le |v3-v5|\le 25$, reduces the dissatisfactory imaging quality cause by spherical aberration and by the chromatic aberration.

In addition, the inventors discover that there are some better ratio ranges for different data according to the above various important ratios. Better ratio ranges help the designers to design a better optical performance and an effectively reduce length of a practically possible optical imaging lens set. For example:

To diminish the total length, the present invention proposes to reduce the lens thickness and air gaps between adjacent lens elements. Taking the assembly fabrication and imaging quality into consideration, the lens thickness should suit air gaps. The following conditions help the optical imaging lens set have better arrangement:
1. $BFL/(G_{34}+G_{56})\le 8.1$. Preferably, $0.1\le BFL/(G_{34}+G_{56})\le 8.1$.
2. $AAG/G_{56}\le 9.1$. Preferably, $1.1\le AAG/G_{56}\le 9.1$.
3. $T_1/G_{45}\le 6.6$. Preferably, $1\le T_1/G_{45}\le 6.6$.
4. $ALT/T_6\le 6.9$. Preferably, $2.8\le ALT/T_6\le 6.9$.
5. $T_1/G_{23}\le 2.2$. Preferably, $0.2\le T_1/G_{23}\le 2.2$.
6. $BFL/T_6\le 2.6$. Preferably, $0.1\le BFL/T_6\le 2.6$.
7. $ALT/BFL\le 3.5$. Preferably, $0.5\le ALT/BFL\le 3.5$.

A smaller EFL helps enlarge the field angle so the EFL is preferably smaller. The following conditions help the enlargement of the field angle in order to reduce the total length of the optical imaging lens set:
1. $EFL/(G_{34}+G_{56})\le 42.3$. Preferably, $5.2\le EFL/(G_{34}+G_{56})\le 42.3$.
2. $EFL/T_6\le 11.7$. Preferably, $3.0\le EFL/T_6\le 11.7$.
3. $EFL/BFL\le 4.9$. Preferably, $2.1\le EFL/BFL\le 4.9$.

4. $EFL/G_{23} \leq 8.7$. Preferably, $4.4 \leq EFL/G_{23} \leq 8.7$.

The optical parameters and the total length of the optical imaging lens set together keep a suitable range so the parameters are not so great to enlarge the total length of the optical imaging lens set or too small to fabricate.
1. $TTL/AAG \leq 6.1$. Preferably, $1.5 \leq TTL/AAG \leq 6.1$.
2. $TTL/TL \leq 1.4$. Preferably, $0.9 \leq TTL/TL \leq 1.4$.
3. $TL/T_4 \leq 17.2$. Preferably, $6.9 \leq TL/T_4 \leq 17.2$.

By limiting the optical parameters and the second lens element thickness $T_2$, the second lens element thickness $T_2$ is not so large or so small to facilitate the reduction of the optical aberration cause by the first lens element.
1. $T_3/T_2 \leq 2.7$. Preferably, $0.1 \leq T_3/T_2 \leq 2.7$.
2. $T_2/G_{56} \leq 1.8$. Preferably, $0.1 \leq T_2/G_{56} \leq 1.8$.

By limiting the fourth lens element thickness $T_4$ and other lens element thickness or air gaps, the fourth lens element thickness $T_4$ is not so large or so small to facilitate the reduction of the optical aberration cause by the first lens element to the third lens element.
1. $ALT/T_4 \leq 13.1$. Preferably, $4.6 \leq ALT/T_4 \leq 13.1$.
2. $T_6/T_4 \leq 2.4$. Preferably, $0.5 \leq T_6/T_4 \leq 2.4$.

By limiting the fifth lens element thickness $T_5$ and other lens element thickness or air gaps, the fifth lens element thickness $T_5$ is not so large or so small to facilitate the reduction of the optical aberration cause by the first lens element to the fourth lens element.
1. $T_5/(G_{34}+G_{56}) \leq 6$. Preferably, $0.1 \leq T_5/(G_{34}+G_{56}) \leq 6$.

Both the first lens element and the second lens element have spherical surfaces. They facilitate the easiness of the processing or the fabrication of the lens elements to promote higher production yields.

The gap disposed between the first lens element 10 and the second lens element 20 may be filled with glue or with a film but it is not limited to these so there is no air gap $G_{12}$ disposed between the first lens element 10 and the second lens element 20.

In each one of the above examples, the longitudinal spherical aberration, the astigmatic aberration and the distortion aberration meet requirements in use. By observing three representative wavelengths of red, green and blue, it is suggested that all curves of every wavelength are close to one another, which reveals off-axis light of different heights of every wavelength all concentrates on the image plane, and deviations of every curve also reveal that off-axis light of different heights are well controlled so the examples do improve the spherical aberration, the astigmatic aberration and the distortion aberration. In addition, by observing the imaging quality data the distances amongst the three representing different wavelengths are pretty close to one another, which means the present invention is able to concentrate light of the three representing different wavelengths so that the aberration is greatly improved. Given the above, the present invention provides outstanding imaging quality.

Any one of the following conditions of the optical imaging lens set shows a smaller numerator when the denominator is fixed to exhibit the decrease of the total size:
1. $|v3-v5| \leq 25$.
2. $T_3/T_2 \leq 2.7$.
3. $EFL/(G_{34}+G_{56}) \leq 42.3$.
4. $T_5/(G_{34}+G_{56}) \leq 6$.
5. $BFL/(G_{34}+G_{56}) \leq 8.1$.
6. $T_2/G_{56} \leq 1.8$.
7. $AAG/G_{56} \leq 9.1$.
8. $EFL/T_6 \leq 11.7$.
9. $T_1/G_{45} \leq 6.6$.
10. $ALT/T_4 \leq 13.1$.
11. $EFL/BFL \leq 4.9$.
12. $T_6/T_4 \leq 2.4$.
13. $TTL/AAG \leq 6.1$.
14. $ALT/T_6 \leq 6.9$.
15. $T_1/G_{23} \leq 2.2$.
16. $TTL/TL \leq 1.4$.
17. $TL/T_4 \leq 17.2$.
18. $BFL/T_6 \leq 2.6$.
19. $ALT/BFL \leq 3.5$.
20. $EFL/G_{23} \leq 8.7$.

In the light of the unpredictability of the optical imaging lens set, the present invention suggests the above principles to have a shorter total length of the optical imaging lens set, a larger aperture available, a wider field angle, better imaging quality or a better fabrication yield to overcome the drawbacks of prior art. The above limitations may be properly combined at the discretion of persons who practice the present invention and they are not limited as shown above.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising: a first lens element, a second lens element, a third lens element, a fourth lens element, a fifth lens element and a sixth lens element, said first lens element to said sixth lens element each having an object-side surface facing toward the object side as well as an image-side surface facing toward the image side, wherein:
   no air gap between said first lens element and said second lens element;
   said third lens element has an object-side surface with a concave portion in a vicinity of said optical axis; and
   said sixth lens element has an image-side surface with a convex portion in a vicinity of its periphery;
the optical imaging lens set exclusively has six lens elements with refractive power, EFL is an effective focal length of the optical imaging lens set, BFL is a distance between said image-side surface of said sixth lens element and an image plane along said optical axis, an air gap $G_{23}$ is between said second lens element and said third lens element along said optical axis, v3 is an Abbe number of said third lens element and v5 is an Abbe number of said fifth lens element to satisfy $|v3-v5| \leq 25$, $EFL/BFL \leq 4.9$, and $EFL/G_{23} \leq 8.7$.

2. The optical imaging lens set of claim 1, wherein said second lens element has a second lens element thickness $T_2$ along said optical axis and said third lens element has a third lens element thickness $T_3$ along said optical axis to satisfy $T_3/T_2 \leq 2.7$.

3. The optical imaging lens set of claim 1, wherein an air gap $G_{34}$ between said third lens element and said fourth lens element along said optical axis and an air gap $G_{56}$ between said fifth lens element and said sixth lens element along said optical axis to satisfy $EFL/(G_{34}+G_{56}) \leq 42.3$.

4. The optical imaging lens set of claim 1, wherein said fifth lens element has a fifth lens element thickness $T_5$ along said optical axis, an air gap $G_{34}$ between said third lens element and said fourth lens element along said optical axis and an air gap $G_{56}$ between said fifth lens element and said sixth lens element along said optical axis to satisfy $T_5/(G_{34}+G_{56}) \leq 6$.

5. The optical imaging lens set of claim 1, wherein an air gap $G_{34}$ between said third lens element and said fourth lens element along said optical axis and an air gap $G_{56}$ between said fifth lens element and said sixth lens element along said optical axis to satisfy $BFL/(G_{34}+G_{56})\leq 8.1$.

6. The optical imaging lens set of claim 1, wherein said second lens element has a second lens element thickness $T_2$ along said optical axis and an air gap $G_{56}$ between said fifth lens element and said sixth lens element along said optical axis to satisfy $T_2/G_{56}\leq 1.8$.

7. The optical imaging lens set of claim 1, wherein a sum of all air gaps AAG between each lens elements from said first lens element to said sixth lens element along said optical axis and an air gap $G_{56}$ between said fifth lens element and said sixth lens element along said optical axis to satisfy $AAG/G_{56}\leq 9.1$.

8. The optical imaging lens set of claim 1, wherein said sixth lens element has a sixth lens element thickness $T_6$ along said optical axis to satisfy $EFL/T_6\leq 11.7$.

9. The optical imaging lens set of claim 1, wherein said first lens element has a first lens element thickness $T_1$ along said optical axis and an air gap $G_{45}$ between said fourth lens element and said fifth lens element along said optical axis to satisfy $T_1/G_{45}\leq 6.6$.

10. The optical imaging lens set of claim 1, wherein ALT is a total thickness of all six lens elements and said fourth lens element has a fourth lens element thickness $T_4$ along said optical axis to satisfy $ALT/T_4\leq 13.1$.

11. The optical imaging lens set of claim 1, wherein said fourth lens element has a fourth lens element thickness $T_4$ along said optical axis and said sixth lens element has a sixth lens element thickness $T_6$ along said optical axis to satisfy $T_6/T_4\leq 2.4$.

12. The optical imaging lens set of claim 1, wherein AAG is a sum of all air gaps between each lens elements from said first lens element to said sixth lens element along said optical axis and TTL is a distance from said object-side surface of said first lens element to said image plane to satisfy $TTL/AAG\leq 6.1$.

13. The optical imaging lens set of claim 1, wherein ALT is a total thickness of all six lens elements and said sixth lens element has a sixth lens element thickness $T_6$ along said optical axis to satisfy $ALT/T_6\leq 6.9$.

14. The optical imaging lens set of claim 1, wherein said first lens element has a first lens element thickness $T_1$ along said optical axis to satisfy $T_1/G_{23}\leq 2.2$.

15. The optical imaging lens set of claim 1, wherein TL is a distance between said object-side surface of said first lens element and said image-side surface of said sixth lens element along said optical axis and TTL is a distance from said object-side surface of said first lens element to said image plane to satisfy $TTL/TL\leq 1.4$.

16. The optical imaging lens set of claim 1, wherein TL is a distance between said object-side surface of said first lens element and said image-side surface of said sixth lens element along said optical axis and said fourth lens element has a fourth lens element thickness $T_4$ along said optical axis to satisfy $TL/T_4\leq 17.2$.

17. The optical imaging lens set of claim 1, wherein said sixth lens element has a sixth lens element thickness $T_6$ along said optical axis to satisfy $BFL/T_6\leq 2.6$.

18. The optical imaging lens set of claim 1, wherein ALT is a total thickness of all six lens elements to satisfy $ALT/BFL\leq 3.5$.

* * * * *